(12) United States Patent
Shigeta

(10) Patent No.: US 12,118,850 B2
(45) Date of Patent: *Oct. 15, 2024

(54) GAMING CHIP WITH A STRIPE PATTERN AND MANAGEMENT SYSTEM FOR IDENTIFICATION OF THE GAMING CHIP BASED ON IMAGING

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 125 days.

This patent is subject to a terminal disclaimer.

(21) Appl. No.: 17/967,186

(22) Filed: Oct. 17, 2022

(65) Prior Publication Data

US 2023/0036863 A1    Feb. 2, 2023

Related U.S. Application Data

(63) Continuation of application No. 17/192,567, filed on Mar. 4, 2021, now Pat. No. 11,544,996, which is a
(Continued)

(30) Foreign Application Priority Data

Mar. 31, 2017    (JP) .................. 2017-070704

(51) Int. Cl.
*G07F 17/32*    (2006.01)
*A44C 21/00*    (2006.01)
(Continued)

(52) U.S. Cl.
CPC .......... *G07F 17/3241* (2013.01); *A44C 21/00* (2013.01); *G06K 7/1439* (2013.01);
(Continued)

(58) Field of Classification Search
CPC .............. G07F 17/322; G07F 17/3241; G07F 17/3223; G07F 17/3248; G07F 17/3251;
(Continued)

(56) References Cited

U.S. PATENT DOCUMENTS 3,953,932 A    5/1976    Graves
5,676,376 A    10/1997   Valley
(Continued)

FOREIGN PATENT DOCUMENTS

CA    2836325 A1    11/2012
CA    2984408 A1    2/2017
(Continued)

OTHER PUBLICATIONS

International Search Report dated Jul. 3, 2018 issued in PCT Application PCT/JP2018/013544.
(Continued)

*Primary Examiner* — Justin L Myhr
(74) *Attorney, Agent, or Firm* — NORTON ROSE FULBRIGHT US LLP

(57)    ABSTRACT

A management system includes a recording device recording an image of a gaming chip and an inspection device determining a type and authenticity of the gaming chip. The gaming chip has a multilayer structure in which both sides of a colored layer are sandwiched between light color layers, surface printing representing a type of the gaming chip is performed on outer sides of the light color layers, and an authenticity recognition mark is printed on the colored layer of an inside of the light color layers by an infrared absorbing material. A visible light camera photographs a visible light image of the surface printing, and an infrared light camera photographs an infrared image of the internal printing. The
(Continued)

inspection device determines the type and authenticity of the gaming chip using the visible light image and the infrared image.

23 Claims, 20 Drawing Sheets

Related U.S. Application Data continuation of application No. 15/939,403, filed on Mar. 29, 2018, now Pat. No. 10,977,895.

(51) Int. Cl.
| | |
|---|---|
| *G06K 7/14* | (2006.01) |
| *G06K 19/04* | (2006.01) |
| *G06K 19/077* | (2006.01) |
| *G06K 19/14* | (2006.01) |
| *G07D 7/12* | (2016.01) |

(52) U.S. Cl.
CPC ..... *G06K 19/047* (2013.01); *G06K 19/07758* (2013.01); *G06K 19/145* (2013.01); *G07D 7/12* (2013.01); *G07F 17/3202* (2013.01); *G07F 17/322* (2013.01); *G07F 17/3248* (2013.01)

(58) Field of Classification Search
CPC ............. G06K 19/047; G06K 7/10415; G06K 7/1439; G07D 5/00; A63F 2250/58; A63F 3/00157; B42D 25/382
See application file for complete search history.

(56) References Cited

U.S. PATENT DOCUMENTS

| | | | |
|---|---|---|---|
| 8,392,707 B2 | 3/2013 | Morrow et al. | |
| 2003/0036425 A1 | 2/2003 | Kaminkow | |
| 2004/0005920 A1 | 1/2004 | Soltys et al. | |
| 2004/0146751 A1 | 7/2004 | Cueli | |
| 2005/0059479 A1 | 3/2005 | Soltys et al. | |
| 2006/0068878 A1* | 3/2006 | Krenn ..................... | G07F 17/32 463/17 |
| 2006/0115139 A1 | 6/2006 | Joshi et al. | |
| 2006/0283934 A1 | 12/2006 | DeRaedt et al. | |
| 2008/0234052 A1 | 9/2008 | Steil | |
| 2009/0075725 A1 | 3/2009 | Koyama | |
| 2009/0093293 A1* | 4/2009 | Koyama ............. | A63F 3/00157 463/17 |
| 2009/0115133 A1 | 5/2009 | Kelly et al. | |
| 2009/0291751 A1 | 11/2009 | Koyama | |
| 2010/0105486 A1 | 4/2010 | Shigeta | |
| 2012/0094750 A1 | 4/2012 | Kuo | |
| 2013/0313777 A1 | 11/2013 | Gelinotte et al. | |
| 2014/0332595 A1 | 11/2014 | Moreno | |
| 2016/0071367 A1 | 3/2016 | Litman | |
| 2016/0328913 A1 | 11/2016 | Blazevic | |
| 2017/0039807 A1 | 2/2017 | Shigeta | |
| 2017/0193735 A1 | 7/2017 | Mandava | |
| 2018/0114406 A1 | 4/2018 | Shigeta | |
| 2019/0102987 A1 | 4/2019 | Shigeta | |

FOREIGN PATENT DOCUMENTS

| | | |
|---|---|---|
| CN | 2724128 Y | 9/2005 |
| CN | 1893851 A | 1/2007 |
| CN | 201259700 Y | 6/2009 |
| CN | 101678233 A | 3/2010 |
| CN | 106408785 A | 2/2017 |
| CN | 108734893 B | 11/2018 |
| JP | H07266763 A | 10/1995 |
| JP | 2005205040 A | 8/2005 |
| JP | 2008-246103 A | 10/2008 |
| JP | 2009-066172 A | 4/2009 |
| JP | 2009176002 A | 8/2009 |
| WO | 2003082420 A1 | 10/2003 |
| WO | 2005011428 A1 | 2/2005 |
| WO | 2015034705 A1 | 3/2015 |
| WO | 2017/022767 A1 | 2/2017 |
| ZA | 199309069 | 7/1994 |

OTHER PUBLICATIONS

New Zealand 1st Office Action dated Oct. 31, 2018 issued in Application NZ 741150.
Canadian Office Action dated Jan. 29, 2019 issued in Application CA 2999556.
Sigaporean Office Action dated Jan. 30, 2019 issued in Application SG 10201802592Q.
Macao Office Action dated Apr. 30, 2019 issued in corresponding Application MO 1/001555.
Australian 2nd Office Action dated May 6, 2019 issued in family/corresponding Application AU 2018202285.
Chinese Office Action dated Apr. 21, 2020 issued in CN Application 201810269745.6.
Chinese Office Action dated Dec. 11, 2020 issued in CN Application 201810269745.6.
Japanese Office Action dated Apr. 6, 2021 issued in JP Application 2017-070704.
Korean Office Action dated Apr. 9, 2021 issued in KR Application 10-2019-0147841.
Korean Decision to Grant dated Jun. 14, 2021 issued in KR Application 10-2019-0147841.
Singaporean Office Action dated Aug. 21, 2023 issued in SG Application 10202004672S.
Chinese Office Action dated Jan. 13, 2023 issued in CN Application 201880020705.6.

* cited by examiner

GAMING CHIP WITH A STRIPE PATTERN AND MANAGEMENT SYSTEM FOR IDENTIFICATION OF THE GAMING CHIP BASED ON IMAGING

CROSS REFERENCE TO RELATED APPLICATION

The present application is a continuation of U.S. patent application Ser. No. 17/192,567 filed Mar. 4, 2021, which is continuation of U.S. patent application Ser. No. 15/939,403 filed Mar. 29, 2018 (now U.S. Pat. No. 10,977,895), which claims priority to JP Pat. App. No. 2017-070704 filed Mar. 31, 2017; the entire contents of each application are hereby incorporated by reference.

FIELD

The present invention relates to a gaming chip and a management system of a table game using the same.

BACKGROUND

Conventionally, in a game place such as a casino, a table game using a gaming chip has been carried out. Counterfeiting of the gaming chip is strictly controlled because the gaming chip can be cashed. Various technologies for discriminating a counterfeited gaming chip from an authentic gaming chip have been proposed and adopted. As known technologies, for example, JP 2008-246103 A discloses a method for determining authenticity by embedding a wireless tag, in which identification information is recorded, in a gaming chip and reading the identification information with a reader.

Meanwhile, different values are defined for each type of gaming chips, and a technology for detecting a value of a gaming chip has also been proposed to automate a table game. For example, JP 2008-246103 A discloses a method for determining authenticity by embedding a wireless tag, in which information on a type or a value of gaming chips is recorded in a gaming chip and reading the information with a reader.

SUMMARY

An object of the present invention is to provide a new gaming chip capable of determining authenticity based on an image obtained by photographing.

An aspect of the present invention provides a management system of a table game using a game table, including: a recording device recording an image of a gaming chip; and an inspection device determining a type and authenticity of the gaming chip using a recorded result of the recording device, wherein the gaming chip has a multilayer structure in which a plurality of plastic layers are laminated by thermocompression bonding, an outer layer of the plurality of plastic layers is provided with a representation plastic layer, an outer side of the representation plastic layer is printed with a representation of the type of the gaming chip, a rear side of the representation plastic layer or a plastic layer on an inner side of the representation plastic layer is printed with an authenticity recognition mark by an infrared absorbing material, the recording device is configured to be connected to a normal camera recording and discriminating the representation of the type of the gaming chip which is printed on the outer side of the representation plastic layer, and an infrared camera recording and discriminating the authenticity recognition mark by the infrared absorbing material printed on the plastic layer on the rear side of the representation plastic layer or on the inner side of the representation plastic layer by irradiating infrared rays from a side on which the representation of the type of the gaming chip which is printed on the outer side of the representation plastic layer is printed, and the inspection device is configured to determine the type and the authenticity of the gaming chip using the normal camera and the infrared camera.

By this configuration, it is possible to determine the authenticity of the gaming chip based not only on the print contents on the surface of the gaming chip but also on the contents which are printed inside the gaming chip by the infrared absorbing material. Since the printing using the infrared absorbing material is performed inside the gaming chip, the print is neither visually confirmed from the outside with human eyes, nor peeled out or faded by the use of the gaming chip.

In the management system described above, the authenticity recognition mark of the gaming chip may be printed by a transparent or translucent infrared absorbing material.

By this configuration, the infrared absorbing material used for the internal printing can be more difficult to be visually confirmed from the outside with human eyes.

In the management system described above, the gaming chip may include a colored layer provided at least in the middle of the gaming chip and may be configured in a multilayer structure in which light color layers are laminated on both sides of the colored layer provided in the middle of the gaming chip to form a stripe pattern in a laminating direction on a side surface of the gaming chip, and the inspection device may have a configuration for specifying a type of gaming chips by the colored layer using the normal camera.

By this configuration, it is possible to specify the type of gaming chips by the stripe pattern on the side surface.

In the management system described above, the authenticity recognition mark of the gaming chip may be a character or a pattern.

By this configuration, it is possible to configure the authenticity recognition mark in characters or patterns.

In the management system described above, the management system may further include: a database storing the authenticity recognition mark and the type of the gaming chip by associating the authenticity recognition mark and the type of the gaming chip with each other.

By this configuration, it is possible to specify the type of gaming chips by reading the authenticity recognition mark and referring to the database.

In the management system described above, an RF tag storing RF tag information may be embedded in the gaming chip.

By this configuration, it is possible to read the RF tag information from the gaming chip.

In the management system described above, the management system may further include: a database storing the authenticity recognition mark and the RF tag information by associating the authenticity recognition mark and the RF tag information with each other.

By this configuration, the authenticity recognition mark and the RF tag information are associated with each other.

In the management system described above, the inspection device may inspect whether the authenticity recognition mark and the type of the gaming chip specified at least by the colored layer are associated with each other in the database.

By this configuration, it is possible to determine the authenticity of the gaming chip by determining whether the combination of the authenticity recognition mark with the type specified by the colored layer is correct.

In the management system described above, the inspection device may inspect whether the authenticity recognition mark and the RF tag information are associated with each other in the database.

By this configuration, it is possible to determine the authenticity of the gaming chip depending on whether the combination of the authenticity recognition mark with the RF tag information is correct.

An aspect of the present invention provides a gaming chip having a multilayer structure in which a plurality of plastic layers are laminated by thermocompression bonding, an outer layer of the plurality of plastic layers is provided with a representation plastic layer, an outer side of the representation plastic layer is printed with a representation of the type of the gaming chips, a rear side of the representation plastic layer or a plastic layer on an inner side of the representation plastic layer is printed with an authenticity recognition mark by an infrared absorbing material, and the authenticity recognition mark is irradiated with infrared rays from the side printed with the representation of the type of the gaming chips printed on the outer side of the representation plastic layer by an infrared camera to allow the authenticity recognition mark to be recorded and discriminated by the infrared absorbing material which is printed on the rear side of the representation plastic layer or the plastic layer on the inner side of the representation plastic layer.

By this configuration, it is possible to determine the authenticity of the gaming chip based not only on the print contents on the surface of the gaming chip but also on the contents which are printed inside the gaming chip by the infrared absorbing material. Since the print by the infrared absorbing material is inside the gaming chip, the print is neither visually confirmed from the outside with human eyes, nor peeled out or faded by the use of the gaming chip.

The authenticity recognition mark of the gaming chip may be discriminated by irradiating infrared rays and an association between the authenticity recognition mark and the representation of the type of the gaming chip read by a normal camera may be determined.

By this configuration, it is possible to determine the association of the authenticity recognition mark which can be discriminated by the infrared irradiation with the type of the gaming chip read by the normal camera.

The authenticity recognition mark of the gaming chip may be printed by a transparent or translucent infrared absorbing material.

By this configuration, the infrared absorbing material used for the internal printing can be more difficult to be visually confirmed from the outside with human eyes.

The gaming chip may include a colored layer provided at least in the middle of the gaming chip, and have the multilayer structure in which light color layers are laminated on both sides of the colored layer provided in the middle of the gaming chip so that a stripe pattern in a laminating direction is formed on a side surface of the gaming chip.

By this configuration, it is possible to specify the type of gaming chips by the stripe pattern on the side surface.

The authenticity recognition mark of the gaming chip may be a character or a pattern.

By this configuration, it is possible to configure the authenticity recognition mark in characters or patterns.

In the gaming chip described above, the authenticity recognition mark may be associated with the type of the gaming chip, which is specified at least by the colored layer, in a database.

By this configuration, it is possible to specify the type of gaming chips by reading the authenticity recognition mark and referring to the database.

An RF tag storing RF tag information may be embedded in the gaming chip.

By this configuration, it is possible to read the RF tag information from the gaming chip.

In the gaming chip described above, the authenticity recognition mark may be associated with at least the RF tag information in the database.

By this configuration, the authenticity recognition mark and the RF tag information are associated with each other.

An ID mark may be provided on an outer circumferential surface of the light color layer in UV ink or carbon black ink.

By this configuration, it is possible to attach the ID mark on the side surface.

In the gaming chip described above, the authenticity recognition mark may be associated with at least the ID mark in a database.

By this configuration, the authenticity recognition mark and the ID mark are associated with each other.

An aspect of the present invention provides a management system of a table game using a table game, including: a recording device recording an image of a gaming chip; and an inspection device determining a type and authenticity of the gaming chip using a recorded result of the recording device, wherein a representation of the type of the gaming chip is printed on a surface of the gaming chip, an authenticity recognition mark is printed on the surface of the gaming chip and is printed more inwardly than the printing of the representation of the type of the gaming chip by an infrared absorbing material, the recording device is configured to be connected to a normal camera recording and discriminating the representation of the type of the gaming chip which is printed on the surface of the gaming chip, and an infrared camera recording and discriminating the authenticity recognition mark by the infrared absorbing material printed on the surface of the gaming chip and printed more inwardly than the printing of the representation of the type of the gaming chip by irradiating infrared rays from a side printed with the representation of the type of the gaming chip printed on the surface of the gaming chip, and the inspection device is configured to determine the type and the authenticity of the gaming chip using the normal camera and the infrared camera.

By this configuration, it is possible to determine the authenticity of the gaming chip based not only on the print contents on the surface of the gaming chip but also on the contents which are printed inside the gaming chip by the infrared absorbing material. Since the print by the infrared absorbing material is inside the gaming chip, the print is neither visually confirmed from the outside with human eyes, nor peeled out or faded by the use of the gaming chip.

In the management system described above, the authenticity recognition mark of the gaming chip may be printed by a transparent or translucent infrared absorbing material.

By this configuration, the infrared absorbing material used for the internal printing can be more difficult to be visually confirmed from the outside with human eyes.

In the management system described above, the gaming chip may include a colored layer provided at least in the middle of the gaming chip and may have a multilayer structure in which light color layers are laminated on both sides of the colored layer provided in the middle of the gaming chip to form a stripe pattern in a laminating direction on a side surface of the gaming chip, and the inspection device may have a configuration for specifying a type of gaming chips by the colored layer using the normal camera.

By this configuration, it is possible to specify the type of gaming chips by the stripe pattern on the side surface.

In the management system described above, the authenticity recognition mark of the gaming chip may be a character or a pattern.

By this configuration, it is possible to configure the authenticity recognition mark in characters or patterns.

In the management system described above, the management system may further include: a database storing the authenticity recognition mark and the type of the gaming chip by associating the authenticity recognition mark and the type of the gaming chip with each other.

By this configuration, it is possible to specify the type of gaming chips by reading the authenticity recognition mark and referring to the database.

In the management system described above, an RF tag storing RF tag information may be embedded in the gaming chip.

By this configuration, it is possible to read the RF tag information from the gaming chip.

In the management system described above, the management system may further include: a database storing the authenticity recognition mark and the RF tag information by associating the authenticity recognition mark and the RF tag information with each other.

By this configuration, the authenticity recognition mark and the RF tag information are associated with each other.

In the management system described above, the inspection device may inspect whether the authenticity recognition mark and the type of the gaming chip specified at least by the colored layer are associated with each other in the database.

By this configuration, it is possible to determine the authenticity of the gaming chip by determining whether the combination of the authenticity recognition mark with the type specified by the colored layer is correct.

In the management system described above, the inspection device may inspect whether the authenticity recognition mark and the RF tag information are associated with each other in the database.

By this configuration, it is possible to determine the authenticity of the gaming chip depending on whether the combination of the authenticity recognition mark with the RF tag information is correct.

An aspect of the present invention provides a gaming chip, wherein a representation of a type of the gaming chip is printed on a surface of the gaming chip, an authenticity recognition mark is printed on the surface of the gaming chip and printed more inwardly than the printing of the representation of the type of the gaming chip by an infrared absorbing material, and the authenticity recognition mark is irradiated with infrared rays from a side printed with the representation of the type of the gaming chip printed on the surface of the gaming chip by an infrared camera to allow an infrared absorbing material printed on the surface of the gaming chip and printed more inwardly than the printing of the representation of the type of the gaming chip to record and discriminate the authenticity recognition mark.

By this configuration, it is possible to determine the authenticity of the gaming chip based not only on the print contents on the surface of the gaming chip but also on the contents which are printed inside the gaming chip by the infrared absorbing material. Since the print by the infrared absorbing material is inside the gaming chip, the print is neither visually confirmed from the outside with human eyes, nor peeled out or faded by the use of the gaming chip.

The authenticity recognition mark of the gaming chip may be discriminated by irradiating infrared rays and an association between the authenticity recognition mark and the representation of the type of the gaming chip read by a normal camera is determined.

By this configuration, it is possible to determine the association of the authenticity recognition mark which can be discriminated by the infrared irradiation with the type of the gaming chip read by the normal camera.

The authenticity recognition mark of the gaming chip may be printed by a transparent or translucent infrared absorbing material.

By this configuration, the infrared absorbing material used for the internal printing can be more difficult to be visually confirmed from the outside with human eyes.

The gaming chip may include a colored layer provided at least in the middle of the gaming chip, and have a multilayer structure in which light color layers are laminated on both sides of the colored layer provided in the middle of the gaming chip so that a stripe pattern in a laminating direction is formed on a side surface of the gaming chip.

By this configuration, it is possible to specify the type of gaming chips by the stripe pattern on the side surface.

The authenticity recognition mark of the gaming chip may be a character or a pattern.

By this configuration, it is possible to configure the authenticity recognition mark in characters or patterns.

In the gaming chip described above, the authenticity recognition mark may be associated with the type of the gaming chip, which is specified at least by the colored layer, in a database.

By this configuration, it is possible to specify the type of gaming chips by reading the authenticity recognition mark and referring to the database.

An RF tag storing RF tag information may be embedded in the gaming chip.

By this configuration, it is possible to read the RF tag information from the gaming chip.

In the gaming chip described above, the authenticity recognition mark may be associated with at least the RF tag information in the database.

By this configuration, the authenticity recognition mark and the RF tag information are associated with each other.

An ID mark may be provided on an outer circumferential surface of the light color layer in UV ink or carbon black ink.

By this configuration, it is possible to attach the ID mark on the side surface.

In the gaming chip described above, the authenticity recognition mark may be associated with at least the ID mark in the database.

By this configuration, the authenticity recognition mark and the ID mark are associated with each other.

An aspect of the present invention provides a gaming chip, wherein internal printing is performed inside a gaming chip by an infrared absorbing material, and an infrared image is indicated by the internal printing.

By this configuration, since the inside of the gaming chip is applied with the internal printing representing the infrared image by the infrared absorbing material, it is possible to determine the authenticity of the gaming chip depending on at least the presence or absence of the infrared image.

In the gaming chip described above, surface printing indicating a visible light image may be performed on an outer surface of the gaming chip.

By this configuration, it is possible to determine the authenticity of the gaming chip based on the infrared image represented by the internal printing and the visible light image represented by the surface printing.

In the gaming chip described above, the internal printing may be performed under the surface printing.

By this configuration, since the internal printing is covered with the surface printing, the internal printing can hardly be visually recognized.

The gaming chip described above may be configured of the plurality of layers, and the internal printing may be performed on the surface of any of the plurality of layers.

By this configuration, the internal printing is performed on the surface of any of the layers.

An aspect of the present invention provides a management system of a table game using a gaming chip, including: an infrared camera generating an infrared image by photographing the infrared image indicated by the internal printing; and an inspection device determining authenticity of the gaming chip based on the infrared image.

By this configuration, since the inside of the gaming chip is applied with the internal printing by the infrared absorbing material and the infrared image represented by the internal printing is photographed by the infrared camera, it is possible to determine the authenticity of the gaming chip depending on at least the presence or absence of the infrared image.

The management system described above may further include the visible camera which generates the visible light image by photographing the visible light image of the gaming chip, and the inspection device may also determine the authenticity of the gaming chip based on the visible light image.

By this configuration, it is possible to determine the authenticity of the gaming chip based on the infrared image represented by the internal printing and the visible light image represented by the surface printing.

In the management system described above, the inspection device may recognize contents of the surface printing by performing image recognition on the visible light image, and recognize contents of the internal printing by performing an image recognition on the infrared image.

By this configuration, it is possible to recognize the contents of the surface printing from the visible light image and recognize the contents of the internal printing from the infrared image.

In the management system described above, the inspection device may determine that the gaming chip is a forgery when the recognized contents of the internal printing do not correspond to the contents of the surface printing.

By this configuration, it is possible to determine the authenticity of the gaming chip by comparing the contents of the internal printing with the contents of the surface printing.

According to the present invention, it is possible to determine the authenticity of the gaming chip based on the contents printed on the inside of the gaming chip by the infrared absorbing material.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Hereinafter, embodiments of the present invention will be described with reference to the drawings. It should be noted that the embodiments described below illustrate an example of implementing the present invention and the present invention is not limited to a specific configuration to be described below. In implementation of the present invention, a specific configuration according to the embodiment may be appropriately adopted.

Figure 1:
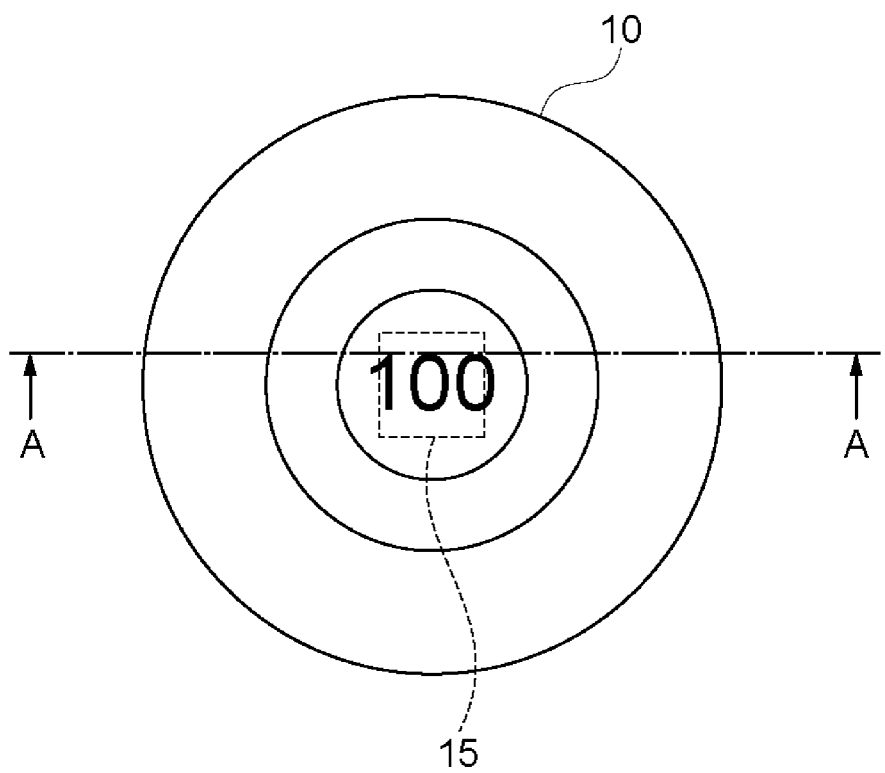
FIG. 1 is a plan view of a gaming chip according to an embodiment of the present invention.
Figure 2:
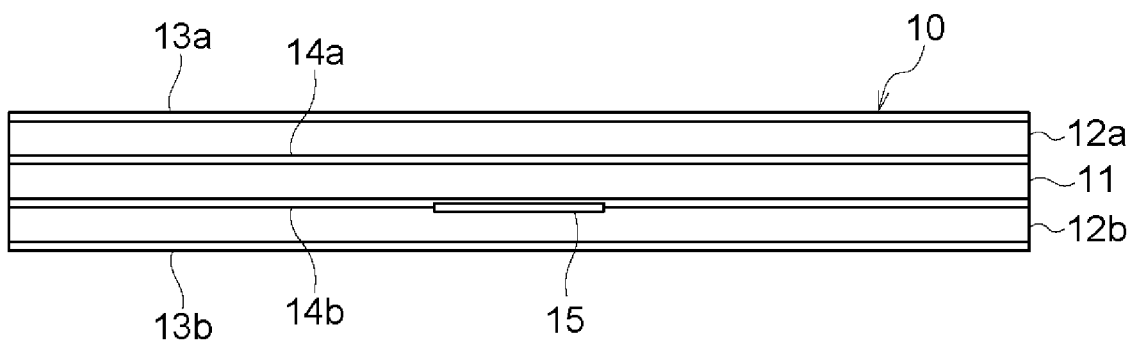
FIG. 2 is a cross-sectional view taken along line A-A of FIG. 1.

First, a gaming chip is described. FIG. 1 is a plan view of a gaming chip according to the present embodiment and FIG. 2 is a cross-sectional view taken along the line A-A in FIG. 1. It should be noted that a gaming chip 10 with front and rear symmetry is described below, but the gaming chip according to the present invention is not limited to the gaming chip with front and rear symmetry and the gaming chip with front and rear asymmetry may be used.

The gaming chip 10 is used for betting and payment in a table game. The gaming chip 10 can be purchased and cashed in a game place such as a casino. There are types of gaming chips 10, and values of each type of the gaming chips are different. Examples of the values of the gaming chip 10 include 10 dollars, 20 dollars, 100 dollars, and 1,000 dollars.

As shown in FIG. 1, the gaming chip 10 according to the present embodiment has a disk shape. The gaming chip 10 is also called a gaming chip, a game token or the like, and a shape thereof is not limited to the disk shape, and the gaming chip 10 may have a rectangular plate shape or shapes other than the plate shape (for example, a three-dimensional shape).

As shown in FIG. 2, the gaming chip 10 according to the present embodiment is formed by laminating a plurality of plastic layers having different colors. The gaming chip 10 includes a layer 11 having a specific color (colored layer) provided at least in the middle of the gaming chip 10, and has a multilayer (three layers in the present embodiment) structure in which light color layers 12a and 12b are laminated on both sides of the colored layer 11.

Both surfaces of the colored layer 11 are printed with a material which absorbs infrared rays, specifically, carbon black. As such, the print performed inside of the gaming chip 10 is referred to as internal printing. The internal printing is performed on both surfaces of the colored layer 11, such that internal printing layers 14a and 14b are configured between the colored layer 11 and each of the light color layers 12 above and under the colored layer 11. The internal printing layers 14a and 14b may be printed with a transparent or translucent material that absorbs infrared rays. As the transparent infrared absorbing material, for example, indium tin oxide, antimony tin oxide, lanthanum hexaboride, and cesium oxide tungsten can be adopted.

Normal ink is used for the printing on the upper light color layer 12a and beneath the lower light color layer 12b. The printing performed on two surfaces of the gaming chip 10 as described above is referred to as surface printing. The surface printing is performed on the surface of the gaming chip 10, such that surface printing layers 13a and 13b are formed on the surfaces of the light color layers 12a and 12b. The layer on which surface printing is performed as described above is referred to as a representation plastic layer. It should be noted that a transparent protective layer may be further provided on an outer side of the surface printing layers 13a and 13b.

Although FIG. 2 shows that the surface printing layers 13a and 13b and the internal printing layers 14a and 14b have a predetermined thickness, in reality, these printing layers are very thin, and therefore have a thickness which can hardly be visually recognized even when the gaming chip 10 is observed from the side (which also goes for the other diagrams). It should be noted that the surface printing and the internal printing may be performed over the whole surface of an object of the printing or performed partially on the surface of the object of the printing.

According to the present embodiment, the surface printing layers 13a and 13b and the light color layers 12a and 12b are formed of a material and in a thickness which can transmit infrared rays. The surface printing layers 13a and 13b and the light color layers 12a and 12b need not transmit 100% of infrared rays and may reflect or absorb infrared rays to some extent. By this configuration, when infrared rays are irradiated from the outer side of the gaming chip 10 toward the gaming chip 10, the infrared rays pass through the surface printing layer 13a (or 13b) and the light color layer 12a (or 12b) in this order and reach the internal printing layer 14a (or 14b).

In connection with the infrared rays reaching the internal printing layer 14a (or 14b), the infrared rays are absorbed in an area with carbon black, and the infrared rays are reflected in an area without carbon black. The reflected infrared rays have information on an image of the internal printing. The reflected infrared rays pass through the light color layer 12a (or 12b) and the surface printing layer 13a (or 13b) in this order and are propagated to the outside of the gaming chip 10. As described above, the infrared rays propagated to the outside of the gaming chip 10 become the image corresponding to the internal printing, and this image is referred to as an infrared image.

An RF tag (also referred to as an RF chip or a contactless tag) 15 which is a wireless tag is embedded between a lower surface of the colored layer 11 on which the internal printing is performed and the lower light color layer 12b. In this manner, the RF tag 15 is embedded in the gaming chip 10.

In manufacturing the gaming chip 10, the plurality of gaming chips 10 are obtained by laminating and thermocompression bonding a plurality of plastic plates followed by punching the plurality of plastic plates. Specifically, first of all, the surface printing is performed on a lower surface of a light-color plastic plate which becomes the lower light color layer 12b, the internal printing is performed on both surfaces of a specific-color plastic plate, which becomes the colored layer 11, with carbon black, and the surface printing is performed on an upper surface of the plastic plate which becomes the upper light color layer 12a. These layers are laminated in this order to form a laminated structure configured of a plurality of plastic layers. At this time, the RF tag 15 is embedded almost in a center of each punching process to obtain the plurality of gaming chips 10. Specifically, the RF tag 15 is disposed between the colored layer 11 and the lower light color layer 12b.

An original plate for the gaming chip is prepared by heating, heat-welding, and compressing each layer of the laminated structure. At this time, with respect to a portion overlapping with the RF tag 15, since the plastic plate is deformed corresponding to the RF tag 15 by heat (In addition, although in FIG. 2, the thickness of the RF tag 15 is shown thicker than the actual thickness, in reality, the thickness of the RF tag 15 is thinner than the shown thickness), the upper surface and the lower surface of the each gaming chip 10 on which thermocompression-bonding is performed are formed in a planar shape without rising up by the RF tag 15.

The original plate for the gaming chip produced in this manner is punched by a mold to obtain the plurality of gaming chips 10 having a predetermined shape. At the time of this punching process, upper and lower corners of the outer side of the gaming chip 10 are subjected to R processing. It should be noted that the surface printing may be performed after the punching.

Next, information included in the gaming chip 10 is described.

The information represented by the surface printing is referred to as the surface printing information. As shown in FIG. 1, a figure (in an example of FIG. 1, "100" indicating 100 dollars) representing the type or the value of the gaming chip 10 is printed on two surfaces of the gaming chip 10, respectively, as the surface printing. Although it is not shown, in addition to the figure, a pattern, a mark of a casino where the gaming chip 10 is used or the like are printed on two surfaces of the gaming chip 10 as the surface printing.

The information represented by the internal printing is referred to as internal printing information. As the internal printing, patterns corresponding to a type of gaming chips 10 are printed. The pattern serves as a mark (authenticity recognition mark) for authenticity recognition. That is, the gaming chip 10 without the authenticity recognition mark can be determined to be a counterfeit, or even when the pattern of the internal printing is a pattern not representing any type of gaming chips 10, it can be determined that the gaming chip 10 is a counterfeit.

Figure 3A:
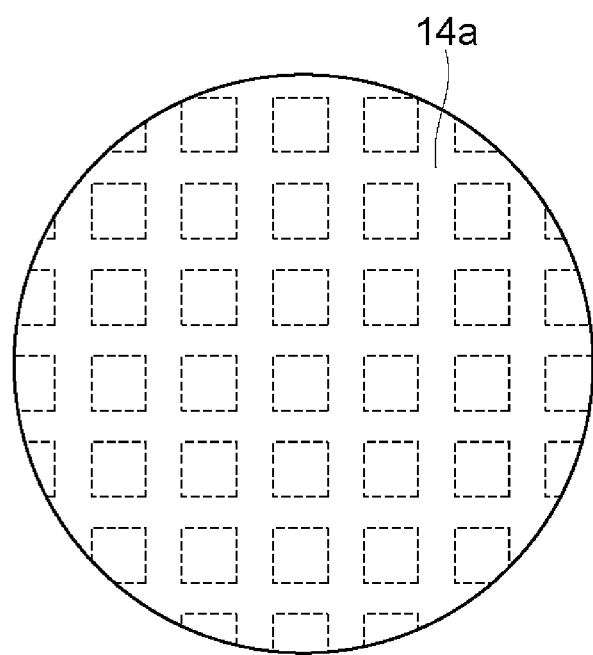
FIG. 3A is a diagram showing an example of a type of patterns of internal printing according to an embodiment of the present invention.
Figure 3B:
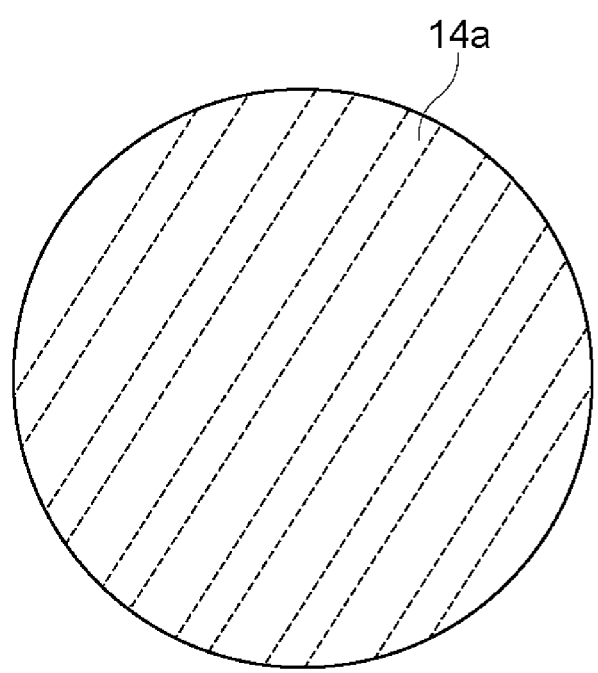
FIG. 3B is a diagram showing an example of a type of patterns of internal printing according to an embodiment of the present invention.

FIG. 3A and FIG. 3B are diagrams showing examples of a type of patterns (authenticity recognition marks) of the internal printing of the internal printing layer 14a. FIG. 3A shows a grid-like pattern, and in this pattern, it may be shown that a value of the gaming chip 10 is, for example, 10 dollars or 20 dollars. FIG. 3B shows a stripe pattern, and in this pattern, it may be shown that a value of the gaming chip 10 is, for example, 100 dollars or 1,000 dollars.

In this way, in the present embodiment, the type of patterns of the internal printing and the type of gaming chips 10 do not correspond one-to-one with each other. In place of this, the type of patterns of the internal printing and the types of gaming chips 10 may correspond one-to-one with each other, such that the type of gaming chips 10 can be specified by the patterns of the internal printing, or all types of gaming chips 10 may have the same patterns of the internal printing, such that the internal printing may only have a function as the authenticity recognition mark.

In the present embodiment, as shown in FIG. 2, the authenticity recognition mark printed as the internal printing is printed on both surfaces of the front surface and the rear surface, that is, both surfaces of the colored layer 11, but the present invention is not necessarily limited thereto and the internal printing may be performed on only one surface of the colored layer 11. In addition, in the case in which the internal printing is performed on both surfaces of the colored layer 11, the contents (patterns) of the internal printing on both surfaces thereof may be different.

Information represented on the side surface of the gaming chip 10 is referred to as side information. As described above, the gaming chip 10 has a multilayer structure in which the colored layer 11 and the light color layers 12a and 12b are laminated, such that as shown in FIG. 2, a stripe pattern in the laminating direction in which the colored layer 11 is sandwiched between the light color layer 12a and the light color layer 12b is formed on the side surface of the gaming chip 10. As described above, each printing layer can hardly be visually recognized when viewed from the side surface.

A color (specific color) of the colored layer 11 of the gaming chip 10 is different for each type (value) of gaming chips 10. For example, a specific color of the gaming chip 10 corresponding to 10 dollars can be red, a specific color of the gaming chip 10 corresponding to 20 dollars can be green, a specific color of the gaming chip 10 corresponding to 100 dollars can be yellow, and a specific color of the gaming chip 10 corresponding to 1,000 dollars can be blue.

The colors of the light color layers 12a and 12b are commonly used for each type of gaming chips 10. That is, the colors of the light color layers 12a and 12b are the same for any type of gaming chips 10. The colors of the light color layers 12a and 12b may be any color as long as the color is lighter (the brightness is higher) than any of the specific colors, and the colors of light color layers 12a and 12b may even be white. That is, the light color layers 12a and 12b may even be white layers.

As described above, the gaming chip 10 has the colored layer 11 and the light color layers 12a and 12b at least in appearance to form a stripe pattern in an axial direction (thickness direction) on the side surface, and has a configuration in which the type of the gaming chip 10 can be specified by the color of the colored layer 11. In this manner, even when the plurality of gaming chips 10 overlap with each other, it is possible to discriminate the type of the gaming chips 10 by the color of the colored layer 11 sandwiched between the light color layers 12a and 12b by observing the side surface of the gaming chips 10. In addition to the above-mentioned information or in place of the above-mentioned information, as the side information, other information may be inscribed on the side surface of the gaming chip 10.

The information stored in the RF tag 15 is referred to as RF tag information. According to the present embodiment, the RF tag 15 stores identification information which uniquely specifies the gaming chip 10, the type (value) of gaming chip 10, and information on the date of manufacture as the RF tag information. In addition to the above-mentioned information or in place of the above-mentioned information, as the RF tag information, other information may be stored.

As described above, the gaming chip 10 has a plurality of readable information, that is, the surface printing information, the internal printing information, the side information, and the RF tag information. Hereinafter, a method for reading each information from outside is described.

Figure 4:
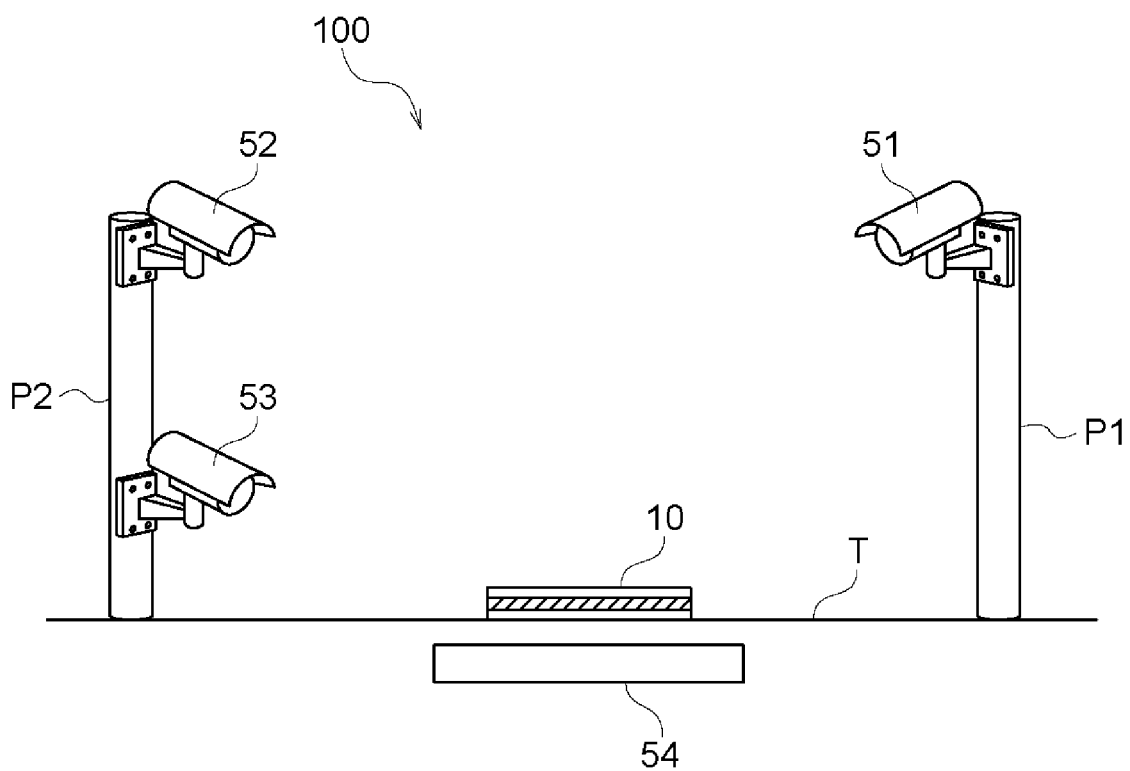
FIG. 4 is a diagram showing a configuration of a management system according to an embodiment of the present invention.
Figure 5:
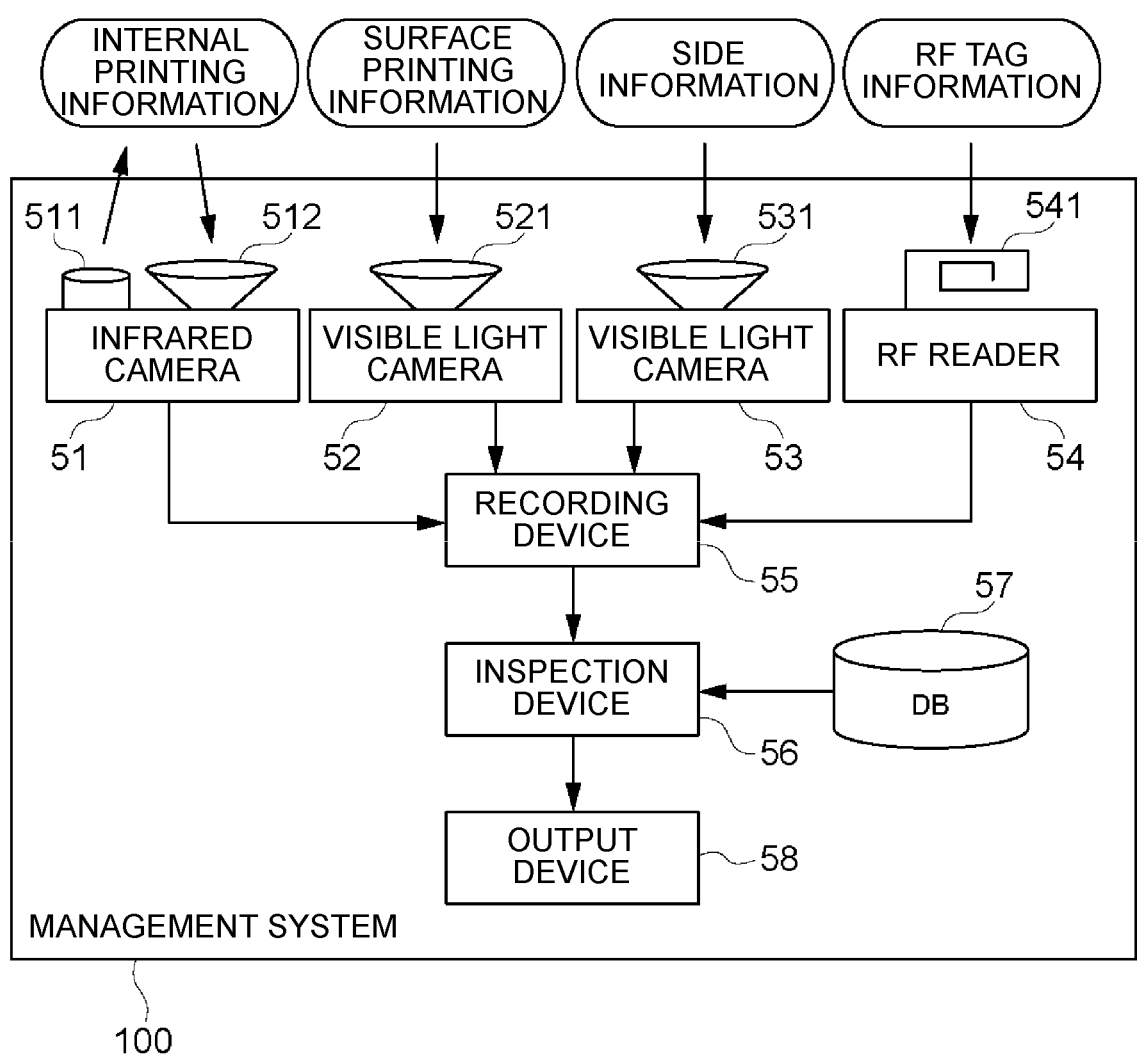
FIG. 5 is a block diagram of the management system according to the embodiment of the present invention.

FIG. 4 is a diagram showing a configuration of a management system according to the embodiment of the present invention and FIG. 5 is a block diagram of the management system according to the present embodiment. As shown in FIG. 4, a management system 100 is configured to read information from the gaming chip 10 placed on a game table T which is a support. Poles P1 and P2 stand upright on the game table T, a high place of the pole P1 is provided with an infrared camera 51, a high place of the pole P2 is provided with a visible light camera 52 which is a normal camera, and a location under the visible light camera 52 at the pole P2 is provided with a visible light camera 53 which is a normal camera. In addition, an RF reader 54 is embedded under a table surface of the game table T.

The infrared camera 51 and the visible light camera 52 are installed downward at a relatively high place so that the surface of the gaming chip 10 can be well photographed from above the gaming chip 10 which is horizontally placed on the game table T. The visible light camera 53 is installed sideways at a relatively lower place so that the side surface of the gaming chip 10 can be well photographed from the side of the gaming chip 10 which is horizontally placed on the game table T.

As shown in FIG. 5, the management system 100 includes the infrared camera 51, the visible light camera 52, the visible light camera 53, and the RF reader 54 which are shown in FIG. 4, and further includes a recording device 55, an inspection device 56, a database 57, and an output device 58. The infrared camera 51 includes an infrared irradiation light 511 and an imaging optical system 512 which includes a lens, a diaphragm, a shutter and the like. The infrared irradiation light 511 irradiates infrared rays to a visual field area of the imaging optical system 512. The infrared camera 51 includes an infrared detection element. The infrared detection element detects an infrared image from a subject through the imaging optical system 512 and generates the infrared image.

The visible light cameras 52 and 53, which are a normal camera, include imaging optical systems 521 and 531 each including a lens, a diaphragm, a shutter and the like. The visible light cameras 52 and 53 include an imaging element which detects visible light. The imaging element detects a visible light image from the subject through the imaging optical systems 521 and 531, and generates the visible light image.

The RF reader 54 includes an antenna 541 which transmits radio waves to the RF tag 15 embedded in the gaming chip 10 and receives the radio waves from the RF tag 15. The RF reader 54 receives the radio waves from the RF tag 15 to read the information (RF tag information) stored in the RF tag 15.

Figure 6A:
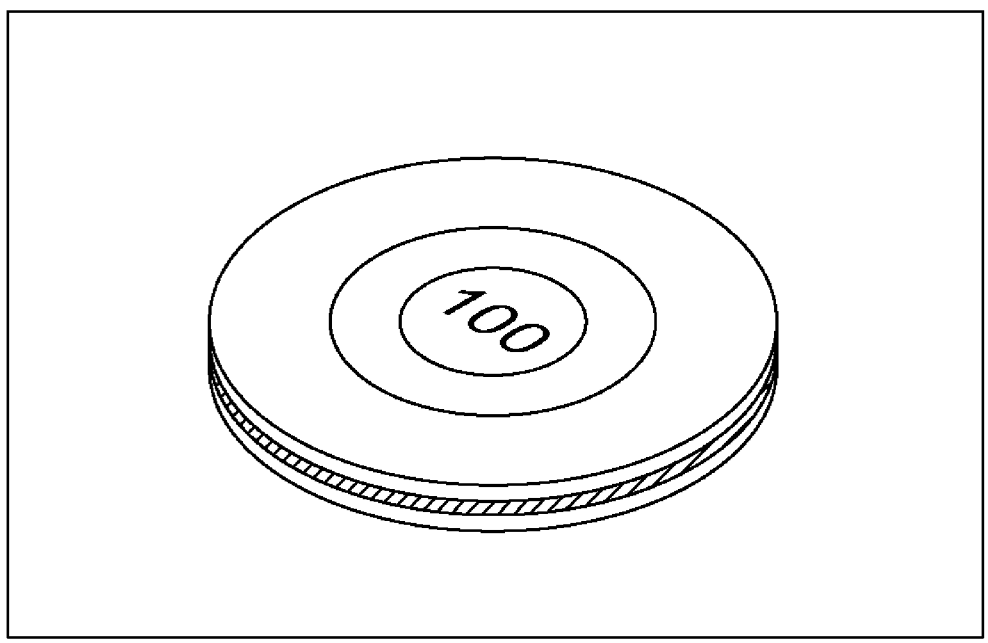
FIG. 6A is a diagram showing an example of a visible light image generated by photographing with a visible light camera according to an embodiment of the present invention.
Figure 6B:
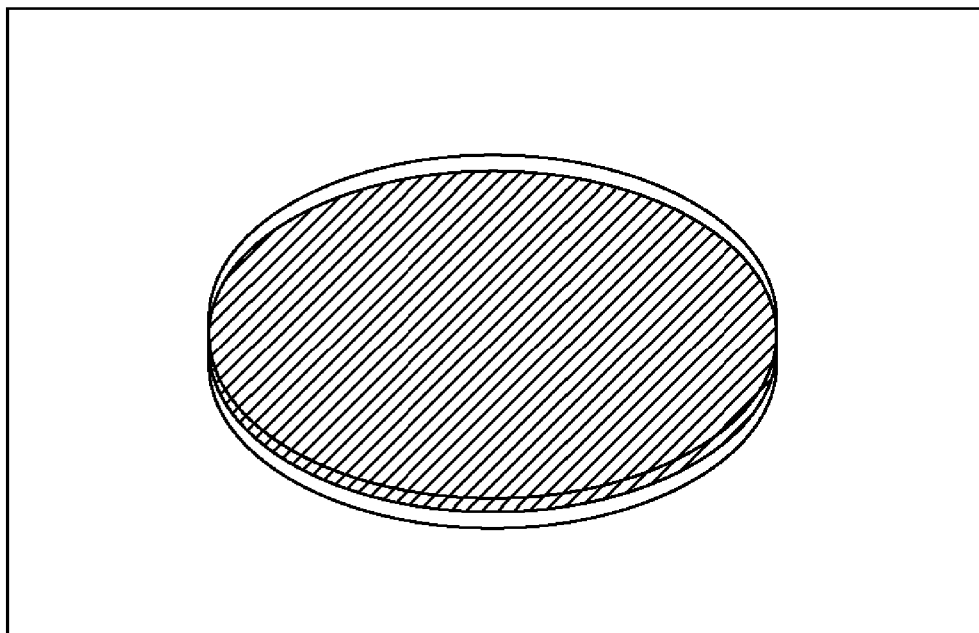
FIG. 6B is a diagram showing an example of an infrared image generated by photographing with an infrared camera according to an embodiment of the present invention.
Figure 6C:
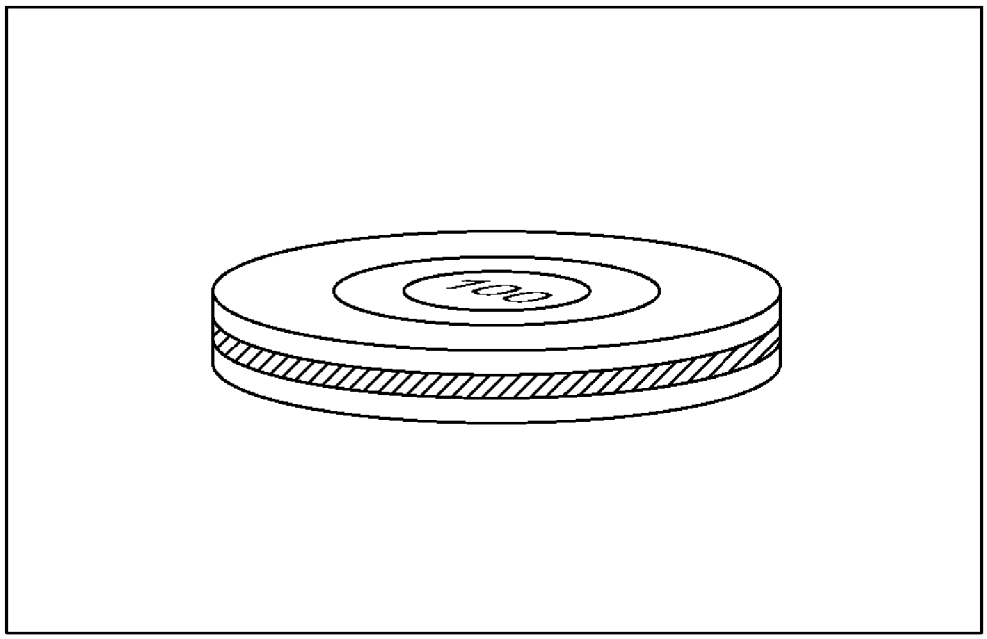
FIG. 6C is a diagram showing an example of a visible light image generated by photographing with a visible light camera according to the embodiment of the present invention.

FIG. 6A is a diagram showing an example of the visible light image generated by photographing with the visible light camera 52, FIG. 6B is a diagram showing an example of the infrared image generated by photographing with the infrared camera 51, and FIG. 6C is a diagram showing an example of the visible light image generated by photographing with the visible light camera 53. As shown in FIG. 6A, in the visible light image obtained by the visible light camera 52, the contents of the surface printing of the gaming chip 10 can be observed well, as shown in FIG. 6B, in the infrared image, the contents of the internal printing of the gaming chip 10 can be observed well, and as shown in FIG. 6C, in the visible light image obtained by the visible light camera 53, the side surface of the gaming chip 10 can be observed well.

The recording device 55 records the infrared image generated by the infrared camera 51, the visible light image generated by each of the visible light cameras 52 and 53, and the RF tag information read by the RF reader 54. The inspection device 56 performs the image recognition processing on the infrared image and the visible light image recorded in the recording device 55, thereby identifying the image.

Specifically, the inspection device 56 can use a machine learning technique such as a neural network to perform a classification into a class attached with a label of the type of the gaming chips 10, thereby identifying the type of the gaming chips 10 or the like. The inspection device 56 is equipped with a machine learning model which classifies each of the infrared image of the infrared camera 51, the visible light image of the visible light camera 52, and the visible light image of the visible light camera 53 into the class. More specifically, the inspection device 56 can perform the class classification using the neural network.

The database 57 stores the RF tag information (identification information, information on the type (value) of gaming chips 10, information on the date of manufacture) on each of the gaming chips 10. In addition, the database 57 stores the internal printing information (pattern represented by the infrared image) and the type of the gaming chips 10 corresponding thereto by associating the internal printing information with the type of the gaming chips 10. According to the present embodiment, the types of gaming chips 10 such as 10 dollars and 20 dollars are associated with the pattern of the internal printing shown in FIG. 3A, and the types of gaming chips 10 such as 100 dollars and 1,000 dollars are associated with the pattern of the internal printing shown in FIG. 3B.

In addition, the database 57 stores the surface printing information and the type of the gaming chips 10 corresponding thereto by associating the surface printing information with the type of the gaming chips 10, and stores the side information and the information on the type of the gaming chips 10 corresponding thereto by associating the side information with the information on the type of the gaming chips 10.

The inspection device 56 specifies the types of gaming chips 10 corresponding to each of the recognized internal printing information, surface printing information, and side information by referring to the database 57. As described above, since the internal printing information does not correspond one-to-one with the type of the gaming chips 10, the type of the gaming chips 10 is specified as 10 dollars or 20 dollars by the internal printing in FIG. 3A, and the type of the gaming chips 10 is specified as 100 dollars or 1,000 dollars by the internal printing in FIG. 3B.

The inspection device 56 further determines the authenticity of the gaming chip 10 by inspecting the gaming chip 10 using the result of the image recognition and/or the RF tag information. The authenticity determination is described below.

The output device 58 outputs the result of the inspection by the inspection device 56. The output device 58 may be, for example, a monitor which displays the inspection result, a communication module which transmits the inspection result to an external device, or a device which outputs the inspection result in other manners.

First, the inspection device 56 determines that the gaming chip 10 is a counterfeit when any of the internal printing information, the surface printing information, the side information, and the RF tag information is not read from the gaming chip 10. In addition, the inspection device 56 determines that the gaming chip 10 is a counterfeit even when any of the internal printing information, the surface printing information, the side information, and the RF tag information is read from the gaming chip 10 but the read information is not stored in the database 57.

Further, the inspection device 56 inspects whether for the same gaming chips 10, the type of the gaming chips 10 represented by the visible light image of the visible light camera 52, the type of the gaming chips 10 represented by the visible light image of the visible light camera 53, and the type of the gaming chips 10 read by the RF reader 54 all coincide with each other, and determines that the gaming chip 10 is a counterfeit when at least one of the three types does not coincide with other information.

The inspection device 56 can specify the type of the gaming chips 10 from all of the internal printing information, the surface printing information, the side information, and the RF tag information, and determines that the gaming chip 10 is authentic when all four specified types of the gaming chip 10 coincide with or correspond to each other. For example, when the type of the gaming chips 10 is specified as 10 dollars or 20 dollars from the internal printing information and when the type of the gaming chips 10 is specified as 10 dollars from the surface printing information, the side information, and the RF tag information, the inspection device 56 determines that the gaming chip 10 is authentic. For example, when any pattern is read as the internal printing information but does not coincide with any pattern of FIG. 3A and FIG. 3B, the inspection device 56 determines that the gaming chip 10 is a counterfeit.

As described above, since the gaming chip 10 according to the present embodiment is subjected to printing which shows the infrared image by infrared rays as the internal printing, even when the gaming chip 10 counterfeited by imitating the pattern or the notation on the surface which can be visually confirmed with human eyes is made, the gaming chip 10 is determined as a counterfeit unless the internal printing is imitated. In addition, the printing is performed inside the gaming chip 10 so that it is possible to prevent the printing from being peeled out or faded by the use of the gaming chip 10 and prevents the contents of the internal printing information and the presence of the internal printing from being visually recognized. In addition, according to the management system 100 of the present embodiment, the internal printing information of the gaming chip 10 and other information included in the gaming chip 10 are compared and verified so that it is possible to determine the authenticity of the gaming chip 10 using the internal printing information which cannot be visually confirmed.

The gaming chip 10 and the management system 100 according to the present invention are not limited to the above-mentioned embodiment and can be variously modified. For example, the structure of the gaming chip 10, the information included in the gaming chip 10, the location of the internal printing layer in the gaming chip 10 and the like are not limited to the above-mentioned embodiments. In addition, the configuration of the management system 100, the authenticity determination method in the management system, and the like are not limited to the above-mentioned embodiments. Hereinafter, modifications are described.

Figure 7:
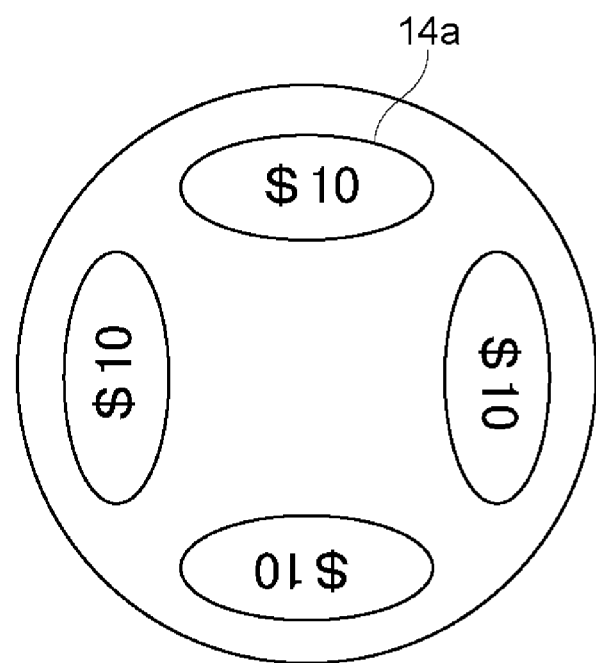
FIG. 7 is a diagram showing internal printing of a gaming chip according to a modification example of the embodiment of the present invention.
Figure 8:
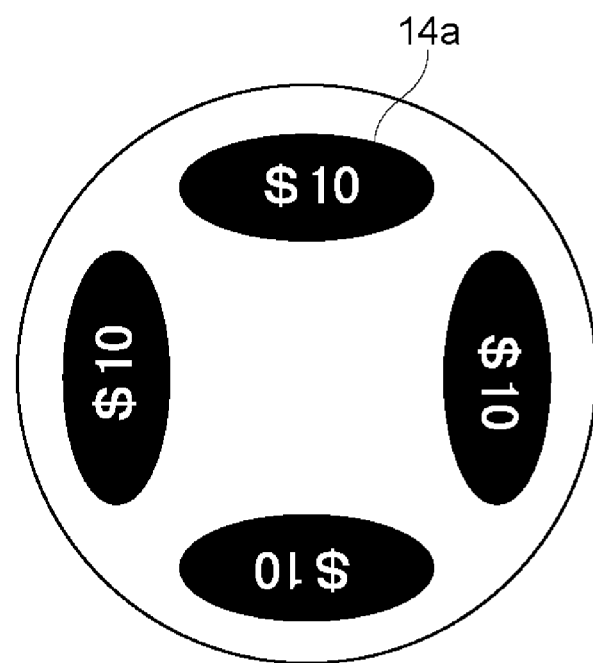
FIG. 8 is a diagram showing internal printing of a gaming chip according to a modification example of the embodiment of the present invention.

FIG. 7 and FIG. 8 each are diagrams showing patterns (authenticity recognition marks) of the internal printing of the internal printing layer 14a of the gaming chip 10 according to the modification example. In the present example, as the internal printing, not patterns but symbols and figures indicating the type (value) of the gaming chip 10 are inscribed in 4 places. The 4 notations are inscribed along the circumference of the gaming chip 10, and angles thereof are shifted from each other by 90°. A symbol and a figure indicating the type (value) of the gaming chip 10, in the example of FIG. 7, a type is inscribed in an elliptical frame, and in the example of FIG. 8, a type is inscribed in white in a black ellipse.

In the examples of FIG. 7 and FIG. 8, since the internal printing information indicates the type of the gaming chips 10 and the internal printing information, the surface printing information, and the side information correspond one-to-one with each other, the inspection device 56 compares the type of gaming chips 10 represented by the internal printing information, the type of gaming chips 10 represented by the surface printing information, and the type of gaming chips 10 represented by the side information and/or the RF tag information to determine whether they coincide with each other, thereby determining the authenticity of the gaming chip 10.

Figure 9:
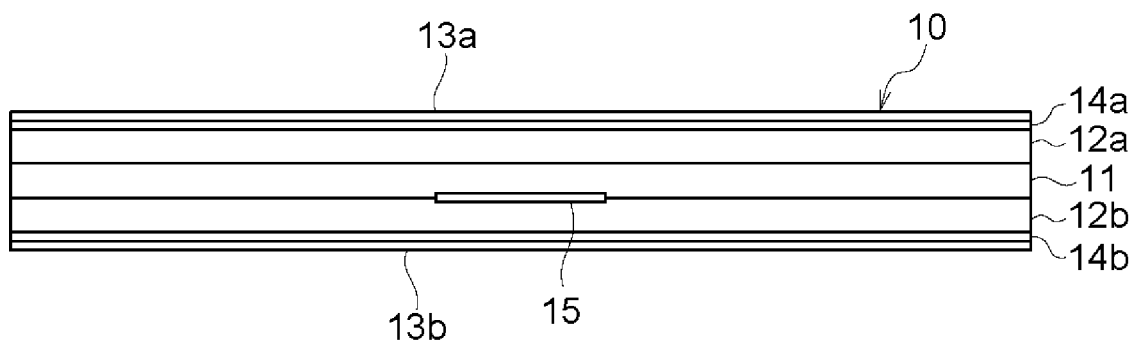
FIG. 9 is a cross-sectional view showing a configuration of a gaming chip according to a modification example of the embodiment of the present invention.

FIG. 9 is a cross-sectional view showing the configuration of the gaming chip 10 according to the modification example. According to the above-mentioned embodiment, the internal printing layer is positioned between the plurality of plastic plates, but according to the present embodiment, the internal printing layers 14a and 14b are provided on the outer side of the laminated structure including the laminated colored layer 11 and the light color layers 12a and 12b having the colored layer 11 sandwiched therebetween, and the surface printing layers 13a and 13b are provided on the internal printing layers 14a and 14b. As described above, the internal printing layers 14a and 14b may not necessarily be provided inside the plastic layer, and may be provided anywhere as long as the internal printing layers 14a and 14b are provided on an inner side of the surface printing layers 13a and 13b.

For manufacturing this gaming chip 10, after the plurality of plastic plates having the RF tag 15 sandwiched therebetween are thermocompression-bonded, the internal printing is performed on the surface of the plurality of plastic plates, and the surface printing is performed on them. It should be noted that the internal printing and the surface printing may be performed before the thermocompression bonding or performed after the punching process. By the configuration, the internal printing layers 14a and 14b are covered with the surface printing layers 13a and 13b without being exposed on the surface and thus cannot be visually recognized from the outside, and the internal printing layers 14a and 14b are protected by the surface printing layers 13a and 13b.

Figure 10:
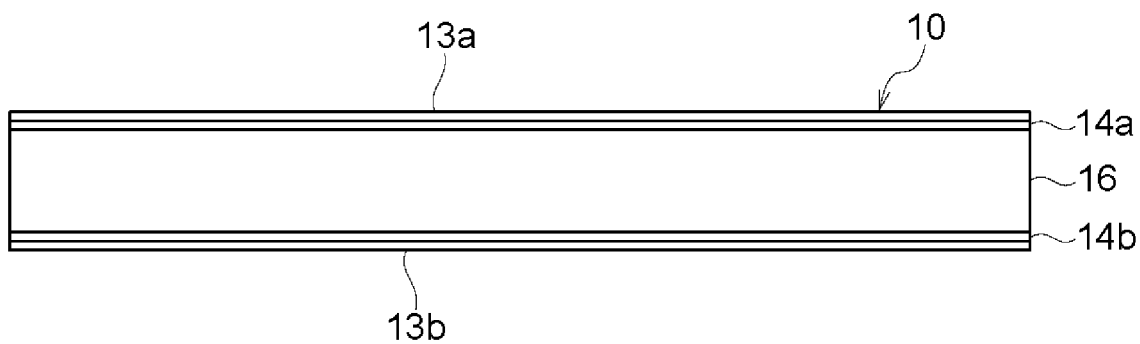
FIG. 10 is a cross-sectional view showing a configuration of a gaming chip according to another modification example of the embodiment of the present invention.

FIG. 10 is a cross-sectional view showing the configuration of the gaming chip 10 according to another modification example. In the above-mentioned embodiment, the gaming chip 10 is configured by laminating the plurality of plastic plates, but in the present modification example, as shown in FIG. 10, the gaming chip 10 is integrally configured as a main body of a gaming chip 16 by injection molding a resin. Similar to the example of FIG. 9, the internal printing layers 14a and 14b are provided between the main body of the gaming chip 16 and the surface printing layers 13a and 13b.

Similarly to the example of FIG. 9, the gaming chip 10 of the present example is also configured as shown in FIG. 10 by forming the surface printing layers 13a and 13b on the internal printing layers 14a and 14b by performing the internal printing on the surface of the main body of the gaming chip 16 to form the internal printing layers 14a and 14b, and then performing the surface printing on the internal printing layers 14a and 14b.

Figure 11:
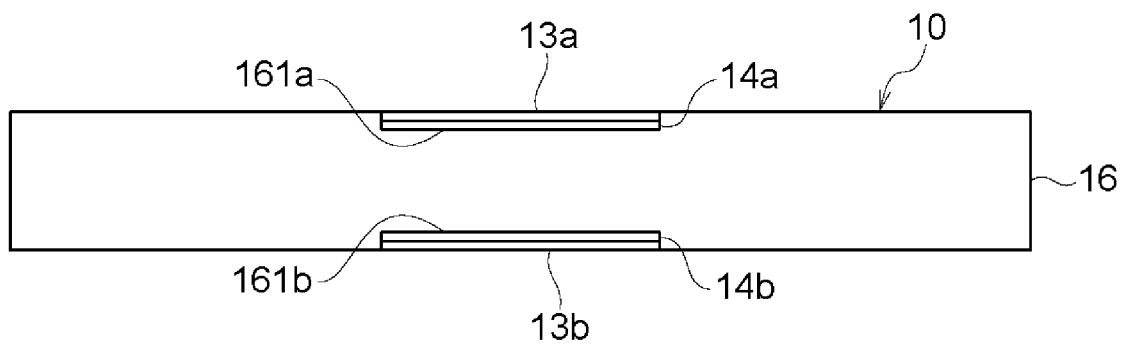
FIG. 11 is a cross-sectional view showing a configuration of a gaming chip according to another modification example of the embodiment of the present invention.

FIG. 11 is a cross-sectional view showing the configuration of the gaming chip 10 according to another modification example. In the present modification example, similar to the example of FIG. 10, the main body of the gaming chip 16 is integrally configured, but recesses 161a and 161b are formed in a central portion of two surfaces of the main body of the gaming chip 16, and the internal printing layers 14a and 14b and the surface printing layers 13a and 13b are formed in the recesses 161a and 161b in this order.

Similarly to the example of FIG. 10, the gaming chip 10 of the present modification example is also formed as shown in FIG. 11 by forming the surface printing layers 13a and 13b on the internal printing layers 14a and 14b by performing the internal printing on the recess 161 of the main body of the gaming chip 16 to form the internal printing layers 14a and 14b, and then performing the surface printing on the internal printing layers 14a and 14b.

Figure 12:
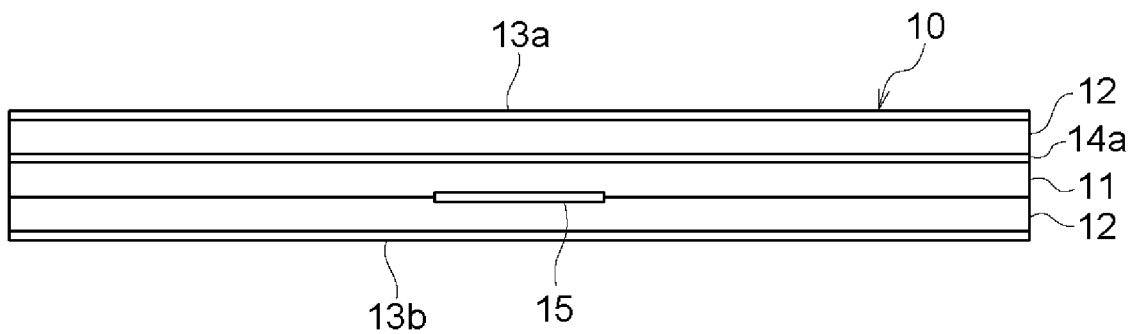
FIG. 12 is a cross-sectional view showing a configuration of a gaming chip according to another modification example of the embodiment of the present invention.

FIG. 12 is a cross-sectional view showing the configuration of the gaming chip 10 according to another modification example. In the present modification example, similarly to the above-mentioned embodiment, the gaming chip 10 is configured by a three-layer plastic layer. However, in the gaming chip 10 of the present modification example, the internal printing layer 14a is provided only between the colored layer 11 and the light color layer 12a, and the internal printing layer 14b is not provided between the colored layer 11 and the light color layer 12b. That is, in the gaming chip 10 according to the above-mentioned embodiment and the modification example thereof, the two-layer internal printing layer 14a is provided to be vertically symmetrical, but in the present modification example, the internal printing layer 14a is provided asymmetrically in a vertical direction.

In the gaming chip 10 of the present modification example, the colored layer 11 may be configured as a layer which infrared rays do not pass through so that the internal printing by the internal printing layer 14a can be observed by the infrared camera 51 only from the upper side in FIG. 12, and in addition to the light color layers 12a and 12b, the colored layer 11 may also be configured as a layer which infrared rays pass through so that the internal printing of the one-layer internal printing layer 14a can be observed from both surfaces of the token coin for 10 by the infrared camera 51.

In the gaming chip 10 of the above-mentioned embodiment and the modification example thereof, different patterns or notations are attached to the internal printing layers 14a and 14b for each type (value) of the gaming chip 10, but alternatively, or in addition to this, as the internal printing, the same contents of the authenticity recognition mark may be printed in all types of gaming chips 10. In this case, the database stores the authenticity recognition mark as the internal printing information, and the inspection device 56 can determine the authenticity of the gaming chip 10 based on the presence or absence of the authenticity recognition mark by referring to the database 57.

Further, the print contents (internal printing information) of the internal printing may have other information. For example, as the internal printing, a two-dimensional barcode indicating identification information may be printed on the internal printing layers 14a and 14b. In this case, the inspection device 56 has a function of a two-dimensional barcode reader. Alternatively, as the internal printing, figures or characters indicating identification information may be inscribed. In this case, the inspection device 56 recognizes the identification information by recognizing the figures or characters inscribed on the internal printing layer using a machine learning model.

In this way, when the printing indicating the identification information is performed as the internal printing information, the identification information may be the same as the identification information of the RF tag information or may be different from the identification information of the RF tag information. When the identification information of the internal printing information is different from the identification information of the RF tag information, the correspondence relationship is stored in the database 57. By referring to the database 57, the inspection device 56 can determine whether the identification information of the internal printing information corresponds to the identification information of the RF tag information to determine the authenticity of the gaming chip 10.

Figure 13:
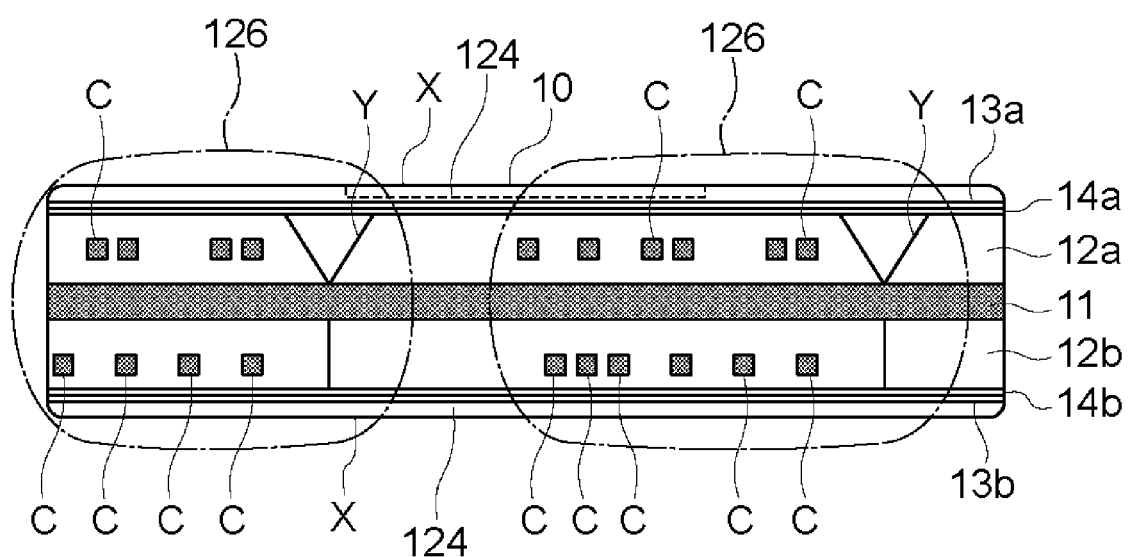
FIG. 13 is a side view of the gaming chip according to a modification example of the embodiment of the present invention.

Next, the modification example of the side information is described. FIG. 13 is a side view of the gaming chip 10 of the present modification example. Similar to the above-mentioned embodiment, the gaming chip 10 is formed by laminating a plurality of plate-shaped plastic layers having different colors, integrating the plurality of plastic layers by a mean of thermocompression bonding or the like, and then punching the plurality of integrated plastic layers in a circle or a quadrangle. The gaming chip 10 manufactured in this way includes the colored layer 11 provided at least in the middle of the gaming chip 10 and is configured in a multilayer structure in which the light color layers 12a and 12b (which may be layers (not shown) of any color that is lighter than the color of the colored layer 11) are laminated on both sides (upper and lower sides in FIG. 13) of the colored layer 11 provided in the middle of the gaming chip 10.

By including the colored layer 11 in this way and having the multilayer structure in which the light color layers 12a and 12b are laminated on both sides of the colored layer 11 provided in the middle of the gaming chip 10, the stripe pattern (in the laminating direction) is formed when viewed from the side as shown in FIG. 13, and the type of gaming chips 10 can be specified by changing the colors (red, green, yellow, blue or the like) of the colored layer 11 for each type (10 points, 20 points, 100 points, 1,000 points or the like) of gaming chips 10.

In addition, in the gaming chip 10 of the present modification example, as shown in FIG. 13, a side ID 126 as an ID mark indicating the identification information of the gaming chip 10 is applied to the side surfaces of the light color layers 12a and 12b. The internal printing layers 14a and 14b, the surface printing layers 13a and 13b, and transparent layers 124a and 124b as the outermost layers are provided on two surfaces of the gaming chip 10 in order from the inner side.

For manufacturing the gaming chip 10, first, the internal printing layer 14a and the surface printing layer 13a are formed, the plastic plate having the light color which becomes the light color layer 12a coated with the transparent layer 124a, the internal printing layer 14b, and the surface printing layer 13b are formed, and the plastic plate having the light color which becomes the light color layer 12b coated with the transparent layer 124b and the plastic plate having a specific color which becomes the colored layer 11 are formed in a bounding state by being thermocompression-bonded and then punched in a circle, a rectangular shape or the like by pressing or the like.

The end of the transparent layer 124 which is the outermost layer is subjected to the R processing (rounded corner) by designing a dimension of a die and a punch of a mold for the punching when the punching is performed by the pressing. The transparent layer 124 may be a coating layer of varnish. The side ID 126 is attached to at least three places on the side surface of the gaming chip 10 at intervals in the circumferential direction. The side ID 126 is attached by ink which can be visible by visible light.

Figure 14:
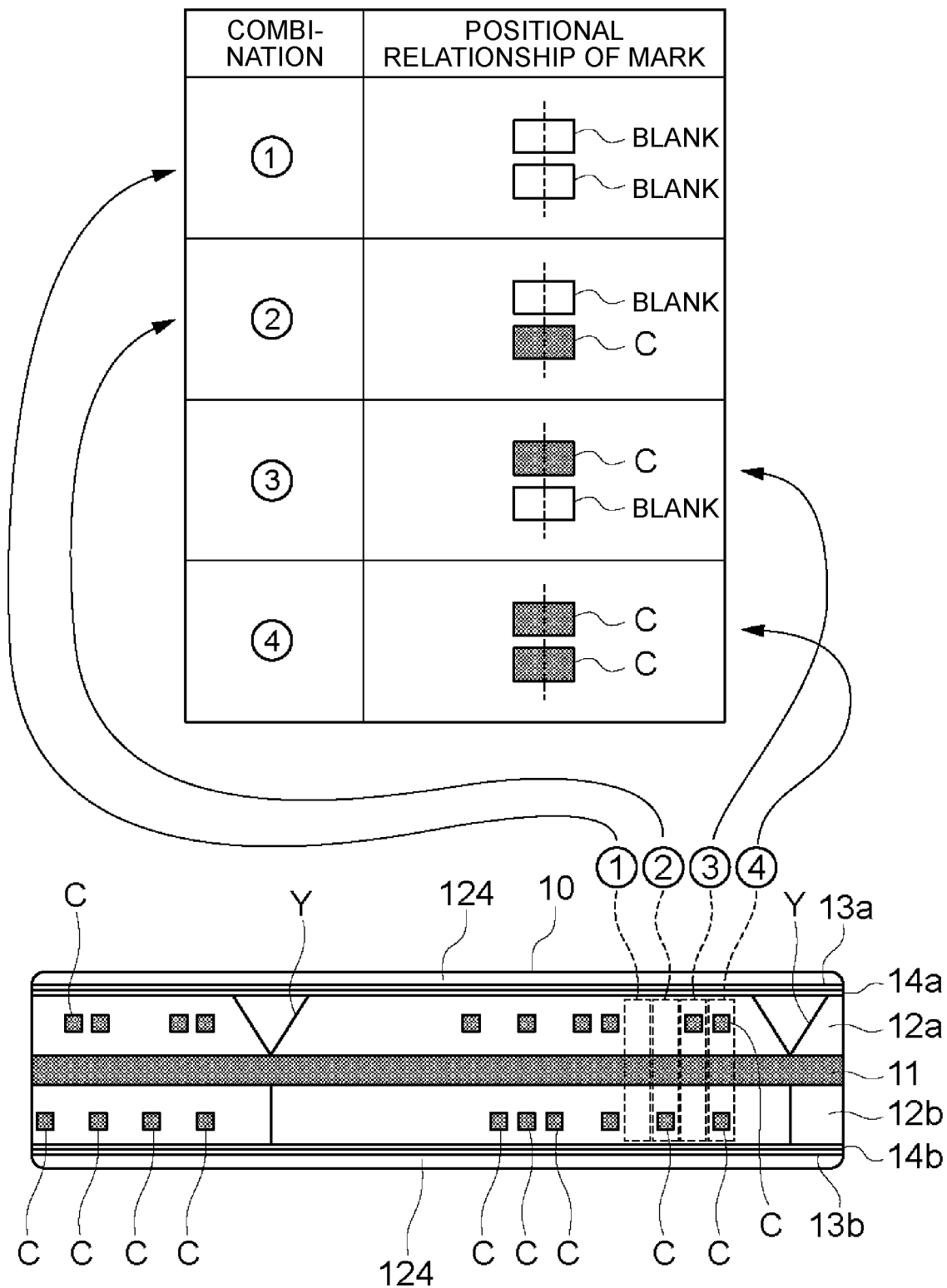
FIG. 14 is a diagram for explaining a code configured in the gaming chip according to the modification example of the embodiment of the present invention.

In particular, in the present modification example, the side ID 126 configured by the presence or absence of a mark C of a plurality of rows and a plurality of columns is attached. In the mark C of the plurality of rows and a plurality of columns, as shown in FIG. 13, the upper and lower marks C are paired to configure a code, and in FIG. 13, it is assumed that the code is a 10-digit code. FIG. 14 shows a configuration in which the upper and lower marks C are paired to configure codes (four types).

A character Y on a side of the mark C is an identification mark for identifying an upper side and a lower side of the mark. The code configured by the marks C is configured so that a predetermined combination of the marks C can be specified. As a result, in the modification example shown in FIG. 14, when four types of combinations of upper and lower two rows of marks C are printed in 10 columns, $4^{10}$ of potential codes can be configured. As such, the side ID 126 can represent $4^{10}$ of potential information, such that the identification information by the ID 126 can be again given to a sufficient amount of gaming chip 10.

The gaming chip 10 has a multilayer structure in which a plurality of plastic layers having different colors are laminated, at least one layer of the plurality of plastic layers is provided with the colored layer 11, and the light color layers 12*a* and 12*b* are laminated on the outer side of the colored layer 11 so that the stripe pattern in the laminating direction is formed on the side surface of the gaming chip 10. Thus, the gaming chip 10 has the configuration in which the type of gaming chips 10 can be specified by the colored layer 11. The side ID 126 is provided at least three places (preferably six places) on the side surface of the light color layers 12*a* and 12*b*. In the present modification example, 6 side IDs 126 are provided at a predetermined pitch of 60° in a rotation direction (circumferential direction).

The gaming chip 10 is provided with the side IDs 126 that can be individually identified (different for each one) and is provided at a predetermined pitch of 60° in the rotation direction (circumferential direction) so that the side ID 126 can be inevitably seen from the side. The side ID 126 attached to the gaming chip 10 is read by the inspection device 56. By reading the side ID 126 by the inspection device 56, the identification information of the gaming chip 10 can be identified, and the side ID 126 is configured to be able to be managed on the database 57.

The database 57 stores the internal printing information and the side ID 126 by associating the internal printing information and the side ID 126 with each other, and the inspection device 56 determines the authenticity of the gaming chip 10 depending on whether the read internal printing information and the side ID 126 are stored in the database 57 associated with each other by referring to the database 57.

In the present modification example, the side ID 126 is attached by inkjet printing with ink which can be visible by the visible light, but the side ID 126 may be printed by either of ink which cannot be visible by visible light (for example, infrared absorbing ink, UV ink, or the like) or ink which can be visible by at least visible light (including ink which is very small and difficult to be visible). In addition, the side ID 126 may be printed by combining the plural types of inks in plural.

The management system 100 has at least plural cameras which are applicable for the ink used for the printing of the side ID 126 (i.e. a visible light camera when the ink is visible ink, an infrared camera when the ink is infrared reaction ink, an UV camera (UV irradiation machine and visible light camera) when the ink is UV ink), or a camera which can switch multiple functions of a camera which is applicable for the ink(a visible light camera, an infrared camera, and an UV camera (UV irradiation machine, visible light camera, and the like)).

Figure 15:
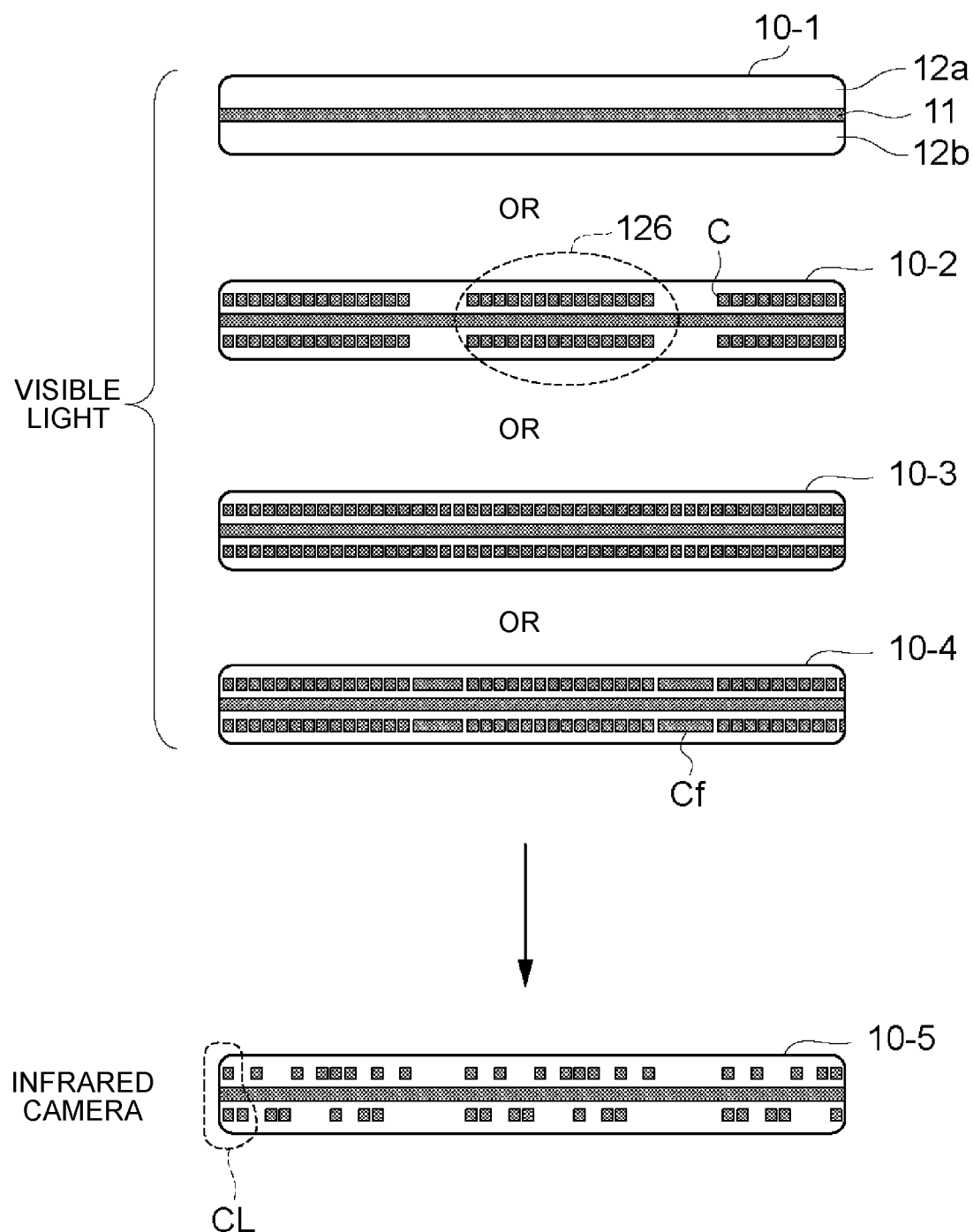
FIG. 15 is a diagram showing modification examples of a side ID according to an embodiment of the present invention.

FIG. 15 is a diagram showing a plurality of modification examples of the side ID 126. The surface printing layer and the internal printing layer are not shown in FIG. 15. In a gaming chip 10-1, the side ID 126 is printed with ink which cannot be visible by the visible light (ink which absorbs infrared rays). In a gaming chip 10-2, the mark C of the plurality of rows and the plurality of columns are printed with ink which appears black in visible light. In a gaming chip 10-3, the mark C is printed with the ink which appears black in the visible light between the side IDs 126, and the side ID 126 is blended into a design so that the side ID 126 does not stand out.

In a gaming chip 10-4, a starting point and a finishing point of the side ID 126 are shown by a mark Cf representing an end. When the gaming chips 10-1 to 10-4 are viewed by the infrared camera, the ink which absorbs infrared rays appears black by absorbing the infrared rays, and the side ID 126 can be photographed in a readable state (shown as a gaming chip 10-5). In addition, the upper and lower sides of the side ID 126 are represented by a mark CL which represents the upper and lower sides. The relationship of the upper and lower sides of the mark is as shown in FIG. 13. It should be noted that the side ID 126 may be printed by a combination of ink which is visible by visible light and the infrared absorbing ink.

In the example of FIG. 13 to FIG. 15, the identification information of the side ID 126 and the internal printing information are stored in the database 57 associated with each other. The inspection device 56 refers to the database 57 to inspect whether the identification information read from the side ID 126 corresponds to the information on the type read from the infrared image of the internal printing, and if the identification information read from the side ID 126 does not correspond to the information on the type read from the infrared image of the internal printing, the inspection device 56 determines that the gaming chip 10 is a counterfeit.

Figure 16:
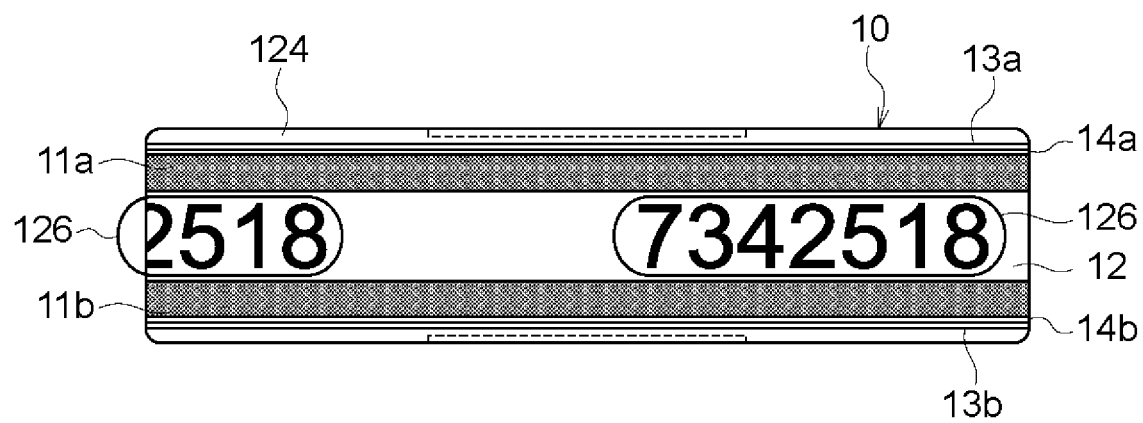
FIG. 16 is a diagram showing another modification example of side information according to the embodiment of the present invention.

FIG. 16 is a diagram showing still another modification example of the side information. In the present modification example, the gaming chip 10 has the three-layer laminated structure as in the above-mentioned embodiment, but has a light color layer 12 provided in the middle of the gaming chip 10 and colored layers 11*a* and 11*b* provided on both sides of the light color layer 12 sandwiched therebetween. The internal printing layer 14*a*, the surface printing layer 13*a*, and the transparent layer 124*a* are provided on the upper surface of the colored layer 11*a* in this order, and the internal printing layer 14*b*, the surface printing layer 13*b*, and the transparent layer 124*b* are provided on the lower surface of the colored layer 12*b* in this order.

Figures as the side ID 126 are printed on the side surface of the gaming chip 10 in 7 digits. Specifically, figures as a mark are printed on the light color layer 12 provided in the middle of the gaming chip 10 to configure the side ID 126. If 10 types as the combination of figures are printed in 7 digits, $10^7$ of potential codes can be configured, such that the side ID 126 of the gaming chip 10 can be sufficiently given.

In the above-mentioned embodiment and modification examples thereof, for example, a relatively wide range of the game table T is photographed by the visible light camera 52, such that the inspection device 56 may recognize a position where the gaming chips 10 are placed on the game table T(for example, a position such as a player, a banker, a pair or the like on which the gaming chip 10 is bet in baccarat) and the number of the gaming chips 10 placed at the position on the game table T in addition to the type of the gaming chips 10 placed on the game table T. Even in this case, for the recognition, the inspection device 56 may use the machine learning technique.

Further, in the gaming chip 10 according to the above-mentioned embodiment and the modification examples thereof, a weighted layer for increasing a weight may also be installed. The weighted layer may contain metal or ceramic. In addition, the material of the layer in the layer of the colored layer 11 may contain, for example, metal powder (for example, one or more metal oxides among zinc oxide and titanium oxide) for increasing the weight so that the colored layer 11 becomes the weighted layer.

In addition, in the above-mentioned embodiment, the internal printing is performed using the infrared absorbing material, but an infrared reflecting material or a fluorescent material which excites in response to infrared rays may be used for the internal printing.

In addition, in the above-mentioned embodiment, the management system 100 is configured in the game table T, and the inspection device 56 determines the authenticity of the gaming chip 10 on the game table T, but the management system 100 according to the present invention may be applied to the inspection system which determines the authenticity of the gaming chip 10. The inspection system can be used at, for example, a back yard in a casino game place, a cashier where cash and the gaming chip 10 are exchanged with each other, and dealer sides of each game table T.

Figure 17:
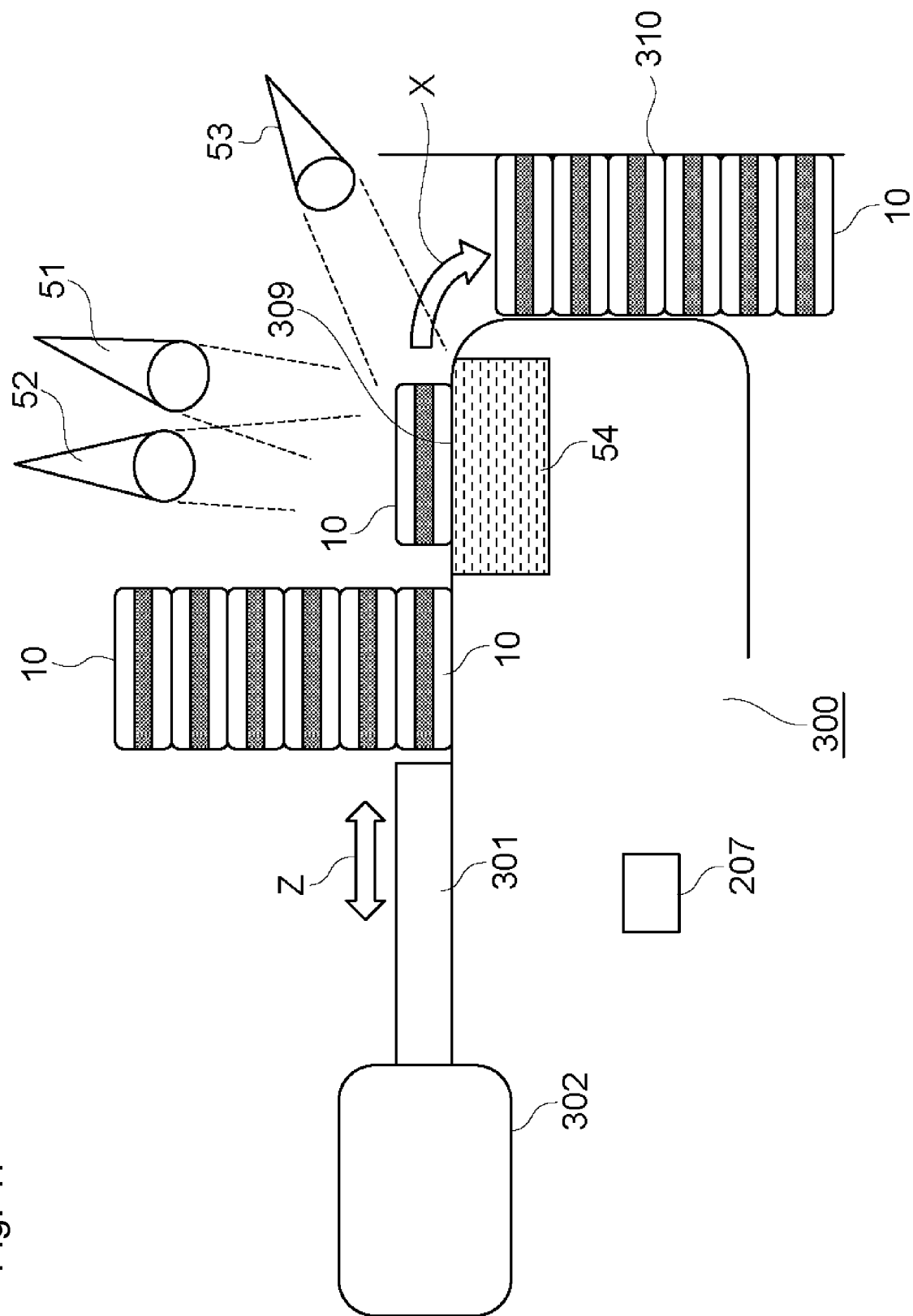
FIG. 17 is a diagram showing a configuration of an inspection system in which a configuration of the management system according to the embodiment of the present invention is adopted.

FIG. 17 is a diagram showing a configuration of an inspection system in which the configuration of the management system according to the embodiment of the present invention is adopted. The inspection system 300 includes the visible light camera 52 for photographing the surface printing, the infrared camera 51 (including an infrared irradiation light) for photographing the internal printing, the visible light camera 53 for photographing the stripe pattern and/or the side ID 126 on the side surface of the gaming chip 10, the RF reader 54 for reading the information on the RF tag (not shown) of the gaming chip 10, and a control device 207 including the recording device 55, the inspection device 56, the database 57, and the output device 58.

The inspection system 300 includes an extrusion device 302 which operates an extrusion portion 301 in an arrow Z direction, and operates the extrusion portion 301 in the arrow Z direction by the extrusion device 302 so that the inspection system 300 supplies the piled gaming chips 10 to a reading stage 309 one by one. In the reading stage 309, the surface printing, the internal printing, and the side surfaces are photographed by the visible light camera 52, the infrared camera 51, and the visible light camera 53 respectively, and the RF tag 15 embedded in the gaming chip 10 is read by the RF reader 54. The gaming chip 10 which has been read is extruded by the next coming gaming chip 10 and drops in an arrow X direction, and the gaming chip 10 which drops in the arrow X direction is held in a holding stage 310.

The authenticity determination method in the inspection device 56 may be the same as in the above-mentioned embodiment or the like. When the internal printing layer of the gaming chip 10 is provided in the front and rear asymmetrically in the inspection system 300, the infrared camera 51 may be provided on both sides of the front side and the rear side of the gaming chip 10. In this manner, the internal printing can be photographed by the infrared camera 51 on at least one of the front side and the rear side of the gaming chip 10.

The present invention can determine the authenticity of the gaming chip based on the contents printed by the infrared absorbing material in the gaming chip and is useful as the gaming chip, the management system of the table game using the same, and the like.

What is claimed is:

1. A management system for managing gaming chips, in which an authenticity recognition mark made of an infrared absorbing material is printed on an inner side of the outermost layer as internal printing, and an indication representing a type of the gaming chips is printed on the outer side of the outermost layer, the management system comprising:
   a normal camera configured to record and identify an indication representing the type of the gaming chip printed on an outer surface of the outermost layer;
   an infrared camera configured to record and discriminate the authenticity recognition mark by irradiating infrared rays from the printed side of the indication representing the type of the gaming chip printed on an outside of the outermost layer; and
   an inspection device configured to determine the type and authenticity of the gaming chips using the normal camera and the infrared camera.

2. The management system according to claim 1, wherein the authenticity recognition mark is printed by a transparent or translucent infrared absorbing material.

3. The management system according to claim 1, wherein the gaming chip has a recess in a central portion of its surface and the outermost layer is provided in the recess.

4. The management system according to claim 1, wherein:
   the gaming chip has at least a coloring layer in the middle and consists of a multilayer structure with light-colored layers on both sides of the middle coloring layer to form a stripe pattern in a stacking direction on the sides, and
   the inspection device is configured to identify the type of the gaming chip by the coloring layer using a normal camera.

5. The management system according to claim 4, further comprising a database configured to store association between the authenticity recognition mark and the type of the gaming chip.

6. The management system according to claim 5, wherein the inspection device is configured to inspect whether or not the authenticity recognition mark and at least the type identified by the coloring layer are associated by the database.

7. The management system according to claim 1, wherein the authenticity recognition mark of the gaming chip is a character or a pattern.

8. The management system according to claim 1, wherein the gaming chips have a built-in RF tag storing RF tag information.

9. The management system according to claim 8, further comprising a database configured to store the RF tag information in association with the authenticity recognition mark.

10. The management system according to claim 9, wherein the inspection device is configured to inspect whether or not the authenticity recognition mark and the RF tag information are associated by the database.

11. The management system according to claim 1, wherein the outermost layer is transparent.

12. A gaming chip, wherein:
    an inner side of an outermost layer is internally printed with an authenticity recognition mark made of an infrared absorbing material, and
    the authenticity recognition mark is used to determine the authenticity of the gaming chip by infrared irradiation from the side printed with an indication of a type of the gaming chip printed on an outside of the outermost layer, using an infrared camera.

13. The gaming chip according to claim 12, wherein the authenticity recognition mark of the gaming chip can be determined by infrared irradiation and can be determined an association with the indication indicating the type of the gaming chip read using a normal camera.

14. The gaming chip according to claim 12, wherein the authenticity recognition mark of the gaming chip is printed with a transparent or translucent infrared absorbing material.

15. The gaming chip according to claim 12, wherein a central portion of a surface has a recess and the outermost layer is provided in the recess.

16. The gaming chip according claim 12, wherein the gaming chip has a coloring layer at least in the middle and comprising a multilayer structure with light-colored layers on both sides of the middle coloring layer to form a stripe pattern in a stacking direction on the sides.

17. The gaming chip according to claim 16, wherein the authenticity recognition mark is associated by a database with at least a type of gaming chip identified by the coloring layer.

18. The gaming chip according to claim 16, wherein the gaming chip is provided with an ID mark made of UV ink or carbon black ink on the outer surface of the light-colored layer.

19. The gaming chip according to claim 18, wherein the authenticity recognition mark is associated with at least the ID mark in a database.

20. The gaming chip according to claim 12, wherein the authenticity recognition mark is a character or a pattern.

21. The gaming chip according to claim 12, wherein the gaming chip has a built-in RF tag storing RF tag information.

22. The gaming chip according to claim 21, wherein the authenticity recognition mark is associated with at least the RF tag information in a database.

23. The gaming chip according to claim 12, wherein the outermost layer is transparent.

* * * * *